US010855537B2

(12) United States Patent
Tembey et al.

(10) Patent No.: US 10,855,537 B2
(45) Date of Patent: Dec. 1, 2020

(54) METHODS AND APPARATUS FOR TEMPLATE DRIVEN INFRASTRUCTURE IN VIRTUALIZED SERVER SYSTEMS

(71) Applicant: VMware, Inc., Palo Alto, CA (US)

(72) Inventors: Priyanka Tembey, San Francisco, CA (US); Atanu Panda, San Jose, CA (US); Thayumanavan Sridhar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/961,561

(22) Filed: Apr. 24, 2018

(65) Prior Publication Data

US 2019/0327144 A1 Oct. 24, 2019

(51) Int. Cl.
*H04L 12/24* (2006.01)
*H04L 29/08* (2006.01)
*H04L 12/931* (2013.01)

(52) U.S. Cl.
CPC ...... *H04L 41/0843* (2013.01); *H04L 41/0869* (2013.01); *H04L 41/5048* (2013.01); *H04L 49/70* (2013.01); *H04L 67/10* (2013.01)

(58) Field of Classification Search
CPC .......................... H04L 41/0843; G06F 17/248
See application file for complete search history.

(56) References Cited

U.S. PATENT DOCUMENTS

| 6,880,002 | B2 * | 4/2005 | Hirschfeld | G06F 9/5077 709/223 |
| 8,108,855 | B2 * | 1/2012 | Dias | G06F 8/60 717/177 |
| 8,331,362 | B2 * | 12/2012 | Shukla | H04L 49/70 370/389 |
| 8,484,353 | B1 * | 7/2013 | Johnson | H04L 47/70 709/226 |
| 8,588,225 | B1 * | 11/2013 | Ganesan | H04L 41/5054 370/389 |
| 8,627,309 | B2 * | 1/2014 | Scheidel | H04L 41/082 717/172 |
| 8,826,268 | B2 * | 9/2014 | Jacobson | G06F 8/60 717/174 |

(Continued)

*Primary Examiner* — Lashonda T Jacobs
(74) *Attorney, Agent, or Firm* — Hanley, Flight and Zimmerman, LLC

(57) ABSTRACT

Methods, apparatus, and articles of manufacture are disclosed for template driven infrastructure in virtualized server systems. An example apparatus includes a catalog mapper to map a requirement and system information associated with a cloud computing environment including a virtual controller to a first tag including instructions to deploy a first virtual resource corresponding to physical hardware and identify a template including the first tag based on the mapping, a plan generator to generate a plan corresponding to the template including an order of execution of tags including the first tag to deploy virtual resources including the first virtual resource to the cloud computing environment, and a controller invoker to deploy a workload domain to the cloud computing environment to execute an application by executing the instructions associated with the first tag included in the template in response to determining that the virtual controller can execute the plan.

27 Claims, 14 Drawing Sheets

(56) References Cited

U.S. PATENT DOCUMENTS

| | | | | |
|---|---|---|---|---|
| 9,003,406 | B1* | 4/2015 | Hodge | G06F 8/61 |
| | | | | 718/1 |
| 9,015,712 | B1* | 4/2015 | Hodge | G06F 8/60 |
| | | | | 718/1 |
| 9,043,786 | B1* | 5/2015 | Hodge | G06F 9/45533 |
| | | | | 718/1 |
| 9,047,133 | B2 | 6/2015 | Winterfeldt | G06F 9/5077 |
| 9,052,961 | B2 | 6/2015 | Mangtani | G06F 9/5077 |
| 9,098,322 | B2* | 8/2015 | Apte | G06F 8/65 |
| 9,177,132 | B2* | 11/2015 | Rendahl | H04L 41/0806 |
| 9,519,513 | B2* | 12/2016 | Zada | G06F 8/61 |
| 9,678,731 | B2* | 6/2017 | Hassine | H04L 41/5045 |
| 9,934,477 | B1* | 4/2018 | Hansen | G06F 11/0793 |
| 10,055,415 | B2* | 8/2018 | Noonan, III | G06Q 10/00 |
| 10,097,410 | B2 | 10/2018 | Singh et al. | |
| 10,127,069 | B2* | 11/2018 | Zada | G06F 9/45558 |
| 10,140,066 | B2* | 11/2018 | Gupta | G06F 3/0635 |
| 10,165,118 | B1* | 12/2018 | Agarwal | H04M 3/493 |
| 10,282,200 | B2* | 5/2019 | Raghavan | G06F 9/46 |
| 10,313,479 | B2* | 6/2019 | Lochhead | H04L 41/5009 |
| 10,318,265 | B1* | 6/2019 | To | G06F 8/61 |
| 10,318,285 | B1* | 6/2019 | Jodoin | G06F 8/71 |
| 10,320,625 | B1* | 6/2019 | Cherumbath | H04L 67/16 |
| 10,417,073 | B2* | 9/2019 | Ackerman | G06F 11/0709 |
| 2006/0245354 | A1* | 11/2006 | Gao | H04L 41/5096 |
| | | | | 370/230 |
| 2012/0054763 | A1* | 3/2012 | Srinivasan | G06F 9/5005 |
| | | | | 718/104 |
| 2012/0303767 | A1* | 11/2012 | Renzin | H04L 41/08 |
| | | | | 709/220 |
| 2013/0283263 | A1* | 10/2013 | Elemary | G06F 9/45558 |
| | | | | 718/1 |
| 2014/0019597 | A1* | 1/2014 | Nath | H04L 41/0843 |
| | | | | 709/220 |
| 2014/0207944 | A1* | 7/2014 | Emaru | H04L 47/78 |
| | | | | 709/224 |
| 2014/0380308 | A1* | 12/2014 | Hassine | G06F 9/45558 |
| | | | | 718/1 |
| 2015/0058461 | A1* | 2/2015 | Guiditta | H04L 41/0843 |
| | | | | 709/223 |
| 2016/0285966 | A1* | 9/2016 | Brech | G06F 3/126 |
| 2016/0357610 | A1* | 12/2016 | Bartfai-Walcott | G06F 9/5061 |
| 2017/0034070 | A1* | 2/2017 | Kollur | H04L 47/70 |
| 2017/0149880 | A1* | 5/2017 | Lochhead | G06F 9/00 |
| 2017/0149931 | A1* | 5/2017 | Lochhead | H04L 41/0896 |
| 2017/0207944 | A1* | 7/2017 | Zhang | H04L 29/06 |
| 2017/0331763 | A1* | 11/2017 | Li | H04L 67/1012 |
| 2018/0143854 | A1* | 5/2018 | Kumar | G06F 9/505 |
| 2018/0322558 | A1* | 11/2018 | Padmanabh | G06F 9/547 |
| 2018/0343170 | A1* | 11/2018 | Sridhar | H04L 41/22 |
| 2018/0343300 | A1 | 11/2018 | Halter et al. | |
| 2019/0012211 | A1* | 1/2019 | Selvaraj | G06F 9/5077 |
| 2019/0109783 | A1* | 4/2019 | Kommula | H04L 41/0668 |
| 2019/0324808 | A1 | 10/2019 | Krishnan et al. | |
| 2019/0324820 | A1 | 10/2019 | Krishnan et al. | |

* cited by examiner

```
502 ── tag: Create-Vcenter
504 ── resource: Vcenter
506 ── version: 6.5.0-00000
508 ── tagData: [VM name(s)], [IP Address(es)], [DNS name(s)]
        required:
        -
510 ──   resource: Psc
512 ──   version: 6.5.0-00000
514 ──   tags:
            -Create-Psc
516 ── tagApi:
        -
518 ──   apiType: REST
520 ──   api: post
522 ──   apiURL: /vcenter
```

```
602 ── templateName: VI
604 ── version: 0.0.1-00000
606 ── description: Creates a VI domain with Vsphere, VSAN
608 ── templateType: VI_DOMAIN
610 ── requiresTemplate: SDDCREADY_0.0.1-00000
611 ── operationTags: Configure-Autoscale; Enable-Backup resources:
612 ──
614 ──   - resource: Host
616 ──     version: 6.5.0-00000
        tags:
          -Configure-Host-Dns
          -Configure-Host-Ntp
618 ──    -Enable-host-VmotionNetwork
          -Enable-Host-Vsan
          -Enable-Host-VsanNetwork 620 ──   - resource: Psc
622 ──     version: 6.5.0-00000
624 ──     tags:
626 ──       -Create-Psc 628 ──   - resource: Vcenter
630 ──     version: 6.5.0-00000
632 ──     tags:
634 ──       -Create-Vcenter
```

FIG. 6

METHODS AND APPARATUS FOR TEMPLATE DRIVEN INFRASTRUCTURE IN VIRTUALIZED SERVER SYSTEMS

FIELD OF THE DISCLOSURE

This disclosure relates generally to cloud computing and, more particularly, to methods and apparatus for template driven infrastructure in virtualized server systems.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, networking devices (e.g., routers, switches, etc.), etc.

BRIEF DESCRIPTION OF THE DRAWINGS

FIG. 5 depicts an example tag that may be used by the example template manager of FIG. 2 to implement the examples disclosed herein.

FIG. 6 depicts an example template that may be used by the example template manager of FIG. 2 to implement the examples disclosed herein.

The figures are not to scale. In general, the same reference numbers will be used throughout the drawing(s) and accompanying written description to refer to the same or like parts.

DETAILED DESCRIPTION

Figure 1:
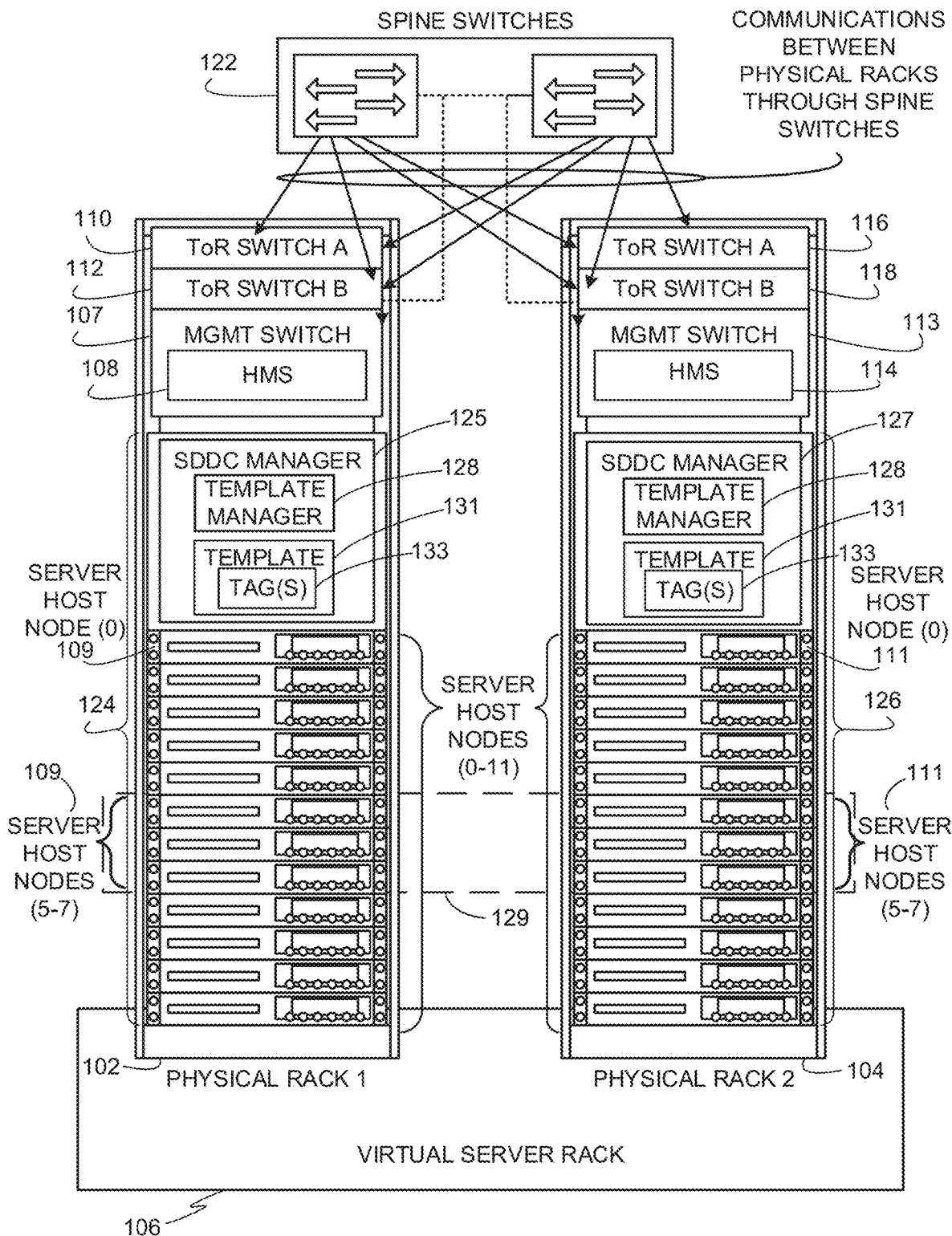
FIG. 1 illustrates example physical racks in an example virtual server rack deployment.

Cloud computing is based on the deployment of many physical resources across a network, virtualizing the physical resources into virtual resources, and provisioning the virtual resources in software defined data centers (SDDCs) for use across cloud computing services and applications. Examples described herein can be used to manage network resources in SDDCs to improve performance and efficiencies of network communications between different virtual and/or physical resources of the SDDCs.

Examples described herein can be used in connection with different types of SDDCs. In some examples, techniques described herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples described herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

Examples described herein can be employed with HCI-based SDDCs deployed using virtual server rack systems such as the virtual server rack 106 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches, etc.) and spine switches connected using a Leaf-Spine architecture. A virtual server rack system also includes software-defined data storage (e.g., storage area network (SAN), VMWARE® VIRTUAL SAN™, etc.) distributed across multiple hosts for redundancy and virtualized networking software (e.g., VMWARE NSX™, etc.).

Examples described herein provide HCI-based SDDCs with system-level governing features that can actively monitor and manage different hardware and software components of a virtual server rack system even when such different hardware and software components execute different OSs. As described in connection with FIG. 2, major components of a virtual server rack system can include a hypervisor, network virtualization software, storage virtualization software (e.g., software-defined data storage, etc.), a physical network OS, and external storage. In some examples, the storage virtualization (e.g., VMWARE VIRTUAL SAN™, etc.) is integrated with the hypervisor. In examples in which the physical network OS is isolated from the network virtualization software, the physical network is not aware of events occurring in the network virtualization environment and the network virtualization environment is not aware of events occurring in the physical network.

When starting up a cloud computing environment or adding resources to an already established cloud computing environment, data center operators struggle to offer cost-effective services while making resources of the infrastructure (e.g., storage hardware, computing hardware, and networking hardware) work together to achieve simplified installation/operation and optimize the resources for improved performance. Prior techniques for establishing and maintaining data centers to provide cloud computing services often require customers or users to understand details and configurations of hardware resources to establish workload domains in which to execute customer services. As used herein, the term "workload domain" refers to virtual hardware policies or subsets of virtual resources of a VM mapped to physical hardware resources to execute a user application.

In examples described herein, workload domains are mapped to a management domain deployment (e.g., a cluster of hosts managed by a vSphere management product developed and provided by VMware, Inc.) in a single rack deployment in a manner that is relatively easier to understand and operate by users (e.g., clients, customers, etc.) than prior techniques. In this manner, as additional racks are added to a system, cross-rack clusters become an option. This enables creating more complex configurations for workload domains as there are more options for deployment as well as additional management domain capabilities that can be leveraged. Examples described herein facilitate making workload domain configuration and management easier than prior techniques.

A management domain is a group of physical machines and/or VMs that host core cloud infrastructure components necessary for managing a SDDC in a cloud computing environment that supports customer services. Cloud computing allows ubiquitous, convenient, on-demand network access to a shared pool of configurable computing resources (e.g., a pool of hardware resources, etc.). A cloud computing customer can request allocations of such resources to support services required by those customers. For example, when a customer requests to run one or more services in the cloud computing environment, one or more workload domains may be created based on resources in the shared pool of configurable computing resources. Examples described herein enable customers to define different domain types, security, machine learning, availability, capacity, and performance requirements for establishing workload domains in server rack deployments without requiring the users to have in-depth knowledge of server rack hardware and/or configurations. In some examples, the requirements include a quantity of tiers in an application (e.g., a three-tier application, a four-tier application, etc.), a quantity of buffer or excess storage capacity on one or more hosts, a fault tolerance level (e.g., a failure-to-tolerate (FTT) level of three), a duration of a workload domain (e.g., a workload domain to be deleted and associated hardware decomposed after three days, seven days, etc.), etc., and/or a combination thereof.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD), etc.), and power capabilities of a workload domain. As used herein, capacity refers to the aggregate number of resources (e.g., aggregate storage, aggregate CPU, aggregate respective hardware accelerators (e.g., field programmable gate arrays (FPGAs), graphic processing units (GPUs)), etc.) across all servers associated with a cluster and/or a workload domain. In examples described herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options). In some examples, resources are computing devices with set amounts of storage, memory, CPUs, etc. In some examples, resources are individual devices (e.g., hard drives, processors, memory chips, etc.).

In prior implementations of provisioning infrastructure for virtualized server systems, a user was typically limited to configuration choices based on availability, performance, and capacity. However, a user such as a data center operator neither had visibility nor ability to select more detailed configurations of virtualized server systems such as choosing an underlying storage to be backed by virtual storage area network (vSAN) or external storage, adding additional third-party applications including third-party security firewalls, enabling encryption or disabling encryption in storage resources, etc. In such prior implementations, an IaaS product operated by the user chose default settings for the more detailed configuration choices described above.

In prior implementations, by not having visibility into specific or underlying configurations applied by the IaaS product, infrastructure provisioned to a cloud computing environment including one or more virtualized server systems operated at reduced efficiency. For example, the provisioned infrastructure may have been incompatible or misaligned with requirements or capabilities of a cloud computing environment associated with a user. In addition, not knowing the configuration of provisioned infrastructure can lead to problems during patching and/or upgrading of the infrastructure, or during auditing and/or compliance validations. For example, a user may unknowingly initiate a detrimental or an incompatible upgrade to one or more resources in a virtualized server system, which can cause the virtualized server system to become inoperable or operate at reduced efficiency.

Examples disclosed herein describe template driven infrastructure in virtualized server systems to improve infrastructure provisioning flexibility and resource allocation. In some disclosed examples, the SDDC manager can provision infrastructure to a cloud computing environment including one or more virtualized server systems using a template (e.g., an infrastructure template). In some disclosed examples, the template includes one or more resources (e.g., virtual resources) and corresponding instructions or tags for provisioning the resources. For example, the template may include a host virtual resource and corresponding instructions to be used by the SDDC manager to configure and enable the host virtual resource when the template is executed. In such an example, the SDDC manager can provide a user with improved visibility regarding underlying configurations of high-level resources (e.g., a host, a virtualized network resource, a virtualized storage resource, etc.) to be allocated to a virtualized server system.

In some disclosed examples, the SDDC manager selects a template from a database (e.g., a template catalog) to deploy one or more resources to a virtualized server system. For example, the SDDC manager may display a plurality of templates to a user to provide the user with improved visibility regarding underlying configurations of the virtualized server system not previously available to the user in prior implementations. For example, the template may include pre-determined selections for a plurality of configurations in addition to availability, capacity, and performance. In some disclosed examples, the SDDC manager determines whether the selected template can be applied to a cloud computing environment associated with the user.

In some disclosed examples, the SDDC manager generates new templates based on modifying existing templates. For example, a user may select a template of interest, to which the user wants to modify by adding a configuration, removing a configuration, and/or altering an existing configuration in the template. In response to modifying the selected template, the example SDDC manager compares the modified template to one or more existing templates, one or more validation rules, etc., and validates the modified template based on the comparison. In some disclosed examples, the SDDC manager determines whether the modified template can be applied to the cloud computing environment associated with the user.

FIG. 1 illustrates example physical racks 102, 104 in an example deployment of a virtual server rack 106. The virtual server rack 106 of the illustrated example enables abstracting hardware resources (e.g., physical hardware resources 124, 126, etc.). In some examples, a cloud computing environment includes one or more virtual server racks such as the virtual server rack 106 of FIG. 1. In some examples, the virtual server rack 106 includes a set of physical units (e.g., one or more racks, etc.) with each unit including hardware such as server nodes (e.g., compute+storage+network links, etc.), network switches, and, optionally, separate storage units. From a user perspective, the example virtual server rack 106 is an aggregated pool of logic resources exposed as one or more VMWARE® ESXI™ clusters along with a logical storage pool and network connectivity. As used herein, the term "cluster" refers to a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 has an example ToR Switch A 110, an example ToR Switch B 112, an example management switch 107, and a plurality of example server host nodes 109. In FIG. 1, the first physical rack 102 includes twelve server host nodes 109 designated as server host nodes(0-11) 109. In the illustrated example, the management switch 107 and the server host node(0) 109 run a hardware management system (HMS) 108 for the first physical rack 102. The second physical rack 104 of the illustrated example is also provided with an example ToR Switch A 116, an example ToR Switch B 118, an example management switch 113, and a plurality of example server host nodes 111. In FIG. 1, the second physical rack 104 includes twelve server host nodes 111 designated as server host nodes(0-11) 111. In the illustrated example, the management switch 113 and the server host node(0) 111 run an HMS 114 for the second physical rack 104.

In the illustrated example, the HMS 108, 114 connects to server management ports of the server host node(0) 109, 111 (e.g., using a baseboard management controller (BMC), etc.), connects to ToR switch management ports (e.g., using 1 gigabits per second (Gbps) links, 10 Gbps links, etc.) of the ToR switches 110, 112, 116, 118, and also connects to spine switch management ports of one or more spine switches 122. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private IP management network for out-of-band (OOB) management. The HMS 108, 114 of the illustrated example uses this OOB management interface to the server management ports of the server host node(0) 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management.

In the illustrated example, the ToR switches 110, 112, 116, 118 connect to server NIC ports (e.g., using 10 Gbps links, etc.) of server hosts in the physical racks 102, 104 for downlink communications and to the spine switch(es) 122 (e.g., using 40 Gbps links, etc.) for uplink communications. In the illustrated example, the management switch 107, 113 is also connected to the ToR switches 110, 112, 116, 118 (e.g., using a 10 Gbps link, etc.) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126, etc.) of the physical rack 102, 104. In the illustrated example, the IB connection interfaces to physical hardware resources 124, 126 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of non-responsive hosts, monitoring catastrophic hardware failures, and firmware upgrades. The example HMS 108, 114 uses IB management to periodically monitor status and health of the physical hardware resources 124, 126 and to keep server objects and switch objects up to date. Example IB operations performed by the HMS 108, 114 include controlling power state, accessing temperature sensors, controlling Basic Input/Output System (BIOS) inventory of hardware (e.g., CPUs, memory, disks, etc.), event monitoring, and logging events.

The HMSs 108, 114 of the corresponding physical racks 102, 104 interface with example software-defined data center (SDDC) managers 125, 127 of the corresponding physical racks 102, 104 to instantiate and manage the virtual server rack 106 using physical hardware resources 124, 126 (e.g., processors, NICs, servers, switches, storage devices, peripherals, power supplies, etc.) of the physical racks 102, 104. In the illustrated example, the SDDC manager 125 of the first physical rack 102 runs on a cluster of three server host nodes of the first physical rack 102, one of which is the server host node(0) 109. Also in the illustrated example, the SDDC manager 127 of the second physical rack 104 runs on a cluster of three server host nodes of the second physical rack 104, one of which is the server host node(0) 111.

In other examples, one instance of the SDDC manager 125, 127 can manage multiple racks or span across multiple racks such as spanning both the physical racks 102, 104. Although the example SDDC manager 125 of the first physical rack 102 is depicted in FIG. 1 as managing the first physical rack 102, alternatively, the SDDC manager 125 may manage a virtual server rack including more than two physical racks. Although the example SDDC manager 127 of the second physical rack 104 is depicted in FIG. 1 as managing the second physical rack 104, alternatively, the SDDC manager 127 may manage a virtual server rack including more than two physical racks. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit.

In the illustrated example, the server host nodes 109, 111 are HCI hosts where computing and storage hardware resources are included in the same node. For example, a storage hardware resource included in the server host(0) 109 of the first physical rack 102 may correspond to a storage type such as a hybrid storage type, an all-flash SSD storage type, an all-flash with non-volatile memory express (NVMe)

storage type, an all NVMe storage type, or a persistent memory acceleration storage type. For example, the hybrid storage type may include a cache disk using Serial Attached SCSI (SAS) or Serial ATA (SATA) SSD and a capacity disk using HDD. In another example, the all-flash SSD storage type may include a cache disk using SAS or SATA SSD and a capacity disk using SAS or SATA SSD.

In the illustrated example, the SDDC managers 125, 127 of the corresponding physical racks 102, 104 communicate with each other through one or more spine switches 122. Also in the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The SDDC manager 125 of the first physical rack 102 runs on a cluster of three server host nodes (e.g., server host nodes(0-2) 109) of the first physical rack 102 using a high availability (HA) mode configuration. In addition, the SDDC manager 127 of the second physical rack 104 runs on a cluster of three server host nodes (e.g., server host nodes (0-2) 111) of the second physical rack 104 using the HA mode configuration. Using the HA mode in this manner, enables fault tolerant operation of the SDDC manager 125, 127 in the event that one of the three server host nodes in the cluster for the SDDC manager 125, 127 fails. Upon failure of a server host node executing the SDDC manager 125, 127, the SDDC manager 125, 127 can be restarted to execute on another one of the hosts in the cluster. Therefore, the SDDC manager 125, 127 continues to be available even in the event of a failure of one of the server host nodes in the cluster.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113, etc.) in the physical rack 102, 104. However, any other programming language and any other OS may be used to implement the HMS 108, 114.

The example SDDC manager 125 of FIG. 1 includes an example template manager 128 to improve flexibility and increase visibility to a user when provisioning the physical hardware resources 124, 126 to a workload domain to execute an application specified by a user. In FIG. 1, the example template manager 128 directs a deployment of an example workload domain 129 to a user environment (e.g., a cloud computing environment associated with a user) based on an example template 131. The workload domain 129 of the illustrated example of FIG. 1 can execute a computing task specified by a user such as executing an application, processing data, performing a calculation, etc.

As used herein the term "user environment" refers to a system under a control, moderation, and/or supervision of an external entity such as a client (e.g., an automation client, a user interface (UI) client, etc.), a user (e.g., a data center operator), etc., to which resources (e.g., physical hardware resources 124, 126, virtual resources, etc.) are allocated. For example, the user environment may correspond to the virtual server rack 106 of FIG. 1. As used herein, the terms "template" or "infrastructure template" are used interchangeably and refer to a configuration of resources (e.g., physical hardware resources 124, 126, virtual resources, etc.) to be provisioned to a virtualized server system (e.g., the virtual server rack 106 of FIG. 1) and corresponding instructions to deploy the resources to the virtualized server system.

In FIG. 1, the example template manager 128 generates the example workload domain 129 based on executing one or more example tags 133 included in the example template 131. As used herein, the terms "tag" "template tag," or "resource tag" are used interchangeably and refer to a data structure including instructions (e.g., computer readable instructions) to deploy a resource to a workload domain. For example, the tag 133 may be associated with deploying a vCenter Server environment to provide an aggregated system view for a user. The example tag 133 may include instructions to deploy the vCenter Server by executing instructions to create a corresponding Platform Services Controller (PSC) and a Representational State Transfer (REST) Application Programming Interface (API). For example, the template manager 128 may cause the vCenter Server to be deployed to the workload domain 129 by executing the template 131 including the example tag 133 including the instructions to create the corresponding PSC and the REST API.

In FIG. 1, the example template manager 128 deployed six hosts including server host nodes(5-7) 109 of the first physical rack 102 and server host nodes (5-7) 111 of the second physical rack 104 to the workload domain 129 based on the example template 131. For example, the template 131 may have been selected by a user from a template catalog including a plurality of infrastructure templates. For example, the user may have selected the template 131 including information corresponding to six hosts with a specific OS version, virtual networking configuration, virtual storage configuration, etc. For example, as depicted in FIG. 1, the template manager 128 deploys the server host nodes 109, 111 to the workload domain 129 by executing the instructions associated with the tag 133 included in the template 131.

Alternatively, the example template 131 may be a modified templated. For example, the template manager 128 may have deployed the server host nodes(5-7) 109 of the first physical rack 102 and the server host nodes (5-7) 111 of the second physical rack 104 to the workload domain 129 based on a user modifying an existing template. For example, the template manager 128 may have obtained requirements from a user and system information associated with a cloud computing environment such as the virtual server rack 106. The example template manager 128 may have mapped the obtained requirements and system information to one or more templates in the template catalog and presented the mapped templates to the user. In response to a selection of a presented template, the example template manager 128 may add, delete, and/or alter one or more resources and/or corresponding instructions included in the presented template based on user input. In response to validating the modified template, the example template manager 128 may have deployed the workload domain 129 of FIG. 1.

Figure 2:
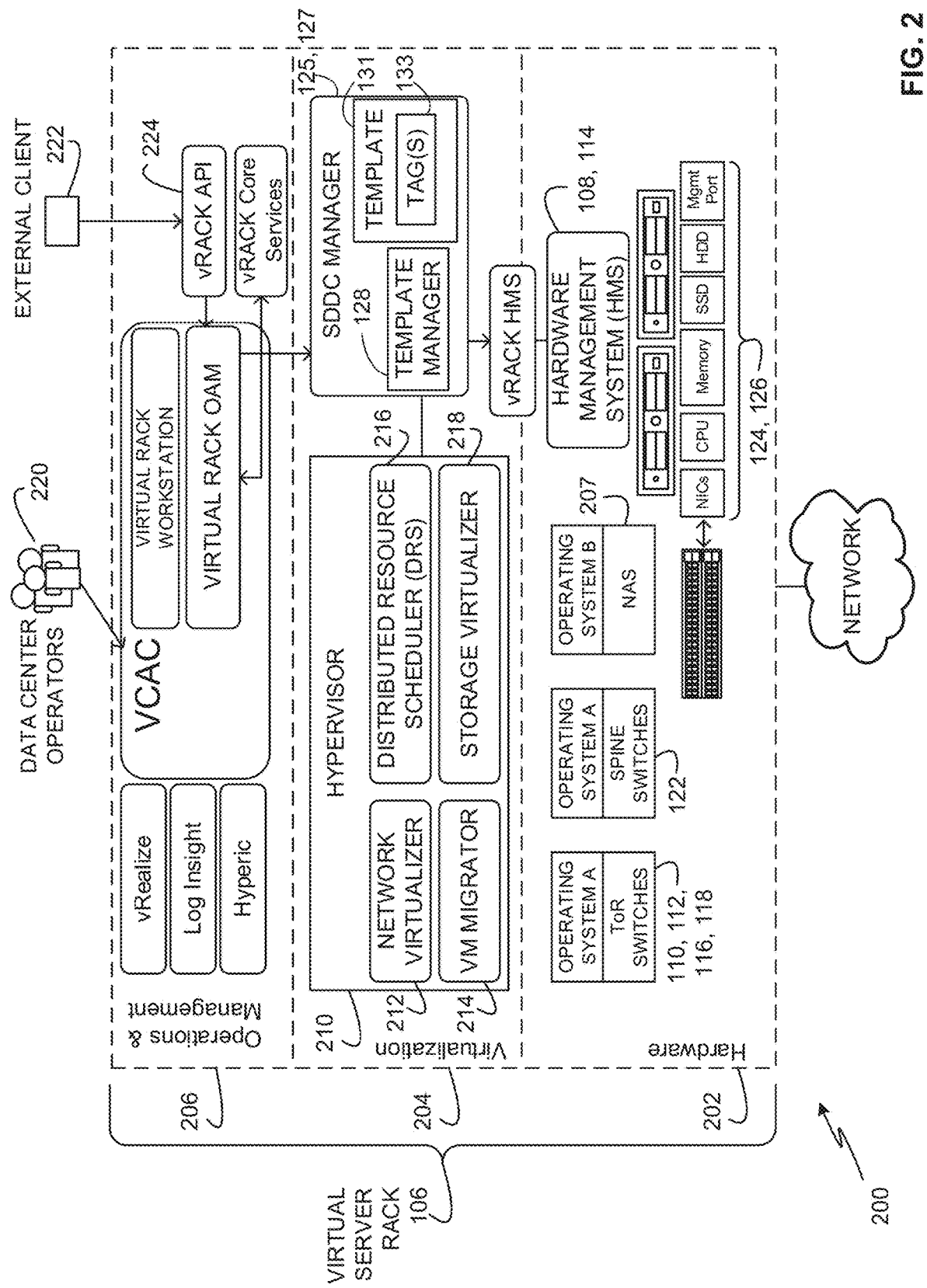
FIG. 2 illustrates an example architecture including an example template manager to configure and deploy the example virtual server rack of FIG. 1.

FIG. 2 depicts an example virtual server rack architecture 200 that may be used to configure and deploy the virtual server rack 106 of FIG. 1. The example architecture 200 of FIG. 2 includes a hardware layer 202, a virtualization layer 204, and an operations and management (OAM) layer 206.

In the illustrated example, the hardware layer 202, the virtualization layer 204, and the OAM layer 206 are part of the example virtual server rack 106 of FIG. 1. The virtual server rack 106 of the illustrated example is based on the physical racks 102, 104 of FIG. 1. The example virtual server rack 106 configures the physical hardware resources 124, 126, virtualizes the physical hardware resources 124, 126 into virtual resources, provisions virtual resources for use in providing cloud-based services, and maintains the physical hardware resources 124, 126 and the virtual resources.

The example hardware layer 202 of FIG. 2 includes the HMS 108, 114 of FIG. 1 that interfaces with the physical hardware resources 124, 126 (e.g., processors, NICs, servers, switches, storage devices, peripherals, power supplies, etc.), the ToR switches 110, 112, 116, 118 of FIG. 1, the spine switches 122 of FIG. 1, and network attached storage (NAS) hardware 207. The NAS hardware 207 of the illustrated example represents external storage resources to the physical racks 102, 104 communicatively coupled to the physical racks 102, 104 via one or more of the spine switches 122. The HMS 108, 114 is configured to manage individual hardware nodes such as different ones of the physical hardware resources 124, 126. For example, managing of the hardware nodes involves discovering nodes, bootstrapping nodes, resetting nodes, processing hardware events (e.g., alarms, sensor data threshold triggers, etc.) and state changes, exposing hardware events and state changes to other resources and a stack of the virtual server rack 106 in a hardware-independent manner. The HMS 108, 114 also supports rack-level boot-up sequencing of the physical hardware resources 124, 126 and provides services such as secure resets, remote resets, and/or hard resets of the physical hardware resources 124, 126.

In the illustrated example of FIG. 2, the virtualization layer 204 includes an example hypervisor 210. The example hypervisor 210 is installed and runs on server hosts in the example physical hardware resources 124, 126 to enable the server hosts to be partitioned into multiple logical servers to create VMs. In some examples, the hypervisor 210 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example of FIG. 2, the hypervisor 210 is shown having a number of virtualization components executing thereon including an example network virtualizer 212, an example VM migrator 214, an example distributed resource scheduler (DRS) 216, and an example storage virtualizer 218. In the illustrated example, the SDDC manager 125, 127 communicates with these components to manage and present the logical view of underlying resources such as hosts and clusters. The example SDDC manager 125, 127 also uses the logical view for orchestration and provisioning of workloads.

The example network virtualizer 212 abstracts or virtualizes network resources such as physical hardware switches (e.g., the management switches 107, 113 of FIG. 1, the ToR switches 110, 112, 116, 118, and/or the spine switches 122, etc.) to provide software-based virtual or virtualized networks. The example network virtualizer 212 enables treating physical network resources (e.g., routers, switches, etc.) as a pool of transport capacity. In some examples, the network virtualizer 212 also provides network and security services to VMs with a policy driven approach. The example network virtualizer 212 includes a number of components to deploy and manage virtualized network resources across servers, switches, and clients. For example, the network virtualizer 212 includes a network virtualization manager that functions as a centralized management component of the network virtualizer 212 and runs as a virtual appliance on a server host.

In some examples, the network virtualizer 212 can be implemented using a VMWARE NSX™ network virtualization platform that includes a number of components including a VMWARE NSX™ network virtualization manager. For example, the network virtualizer 212 can include a VMware® NSX Manager™. The NSX Manager can be the centralized network management component of NSX and is installed as a virtual appliance on any ESX™ host (e.g., the hypervisor 210, etc.) in a vCenter Server environment to provide an aggregated system view for a user. For example, an NSX Manager can map to a single vCenter Server environment and one or more NSX Edge, vShield Endpoint, and NSX Data Security instances. For example, the network virtualizer 212 can generate virtualized network resources such as a logical distributed router (LDR) and/or an edge services gateway (ESG).

The example VM migrator 214 is provided to move or migrate VMs between different hosts without losing state during such migrations. For example, the VM migrator 214 allows moving an entire running VM from one physical server to another with substantially little or no downtime. The migrating VM retains its network identity and connections, which results in a substantially seamless migration process. The example VM migrator 214 enables transferring the VM's active memory and precise execution state over a high-speed network, which allows the VM to switch from running on a source server host to running on a destination server host.

The example DRS 216 is provided to monitor resource utilization across resource pools, to manage resource allocations to different VMs, to deploy additional storage capacity to VM clusters with substantially little or no service disruptions, and to work with the VM migrator 214 to automatically migrate VMs during maintenance with substantially little or no service disruptions.

The example storage virtualizer 218 is software-defined storage for use in connection with virtualized environments. The example storage virtualizer 218 clusters server-attached HDDs and SSDs to create a shared datastore for use as virtual storage resources in virtual environments. In some examples, the storage virtualizer 218 may be implemented using a VMWARE VIRTUAL SAN™ network data storage virtualization component developed and provided by VMware, Inc.

The virtualization layer 204 of the illustrated example, and its associated components are configured to run VMs. However, in other examples, the virtualization layer 204 may additionally and/or alternatively be configured to run containers. For example, the virtualization layer 204 may be used to deploy a VM as a data computer node with its own guest OS on a host using resources of the host. Additionally and/or alternatively, the virtualization layer 204 may be used to deploy a container as a data computer node that runs on top of a host OS without the need for a hypervisor or separate OS.

In the illustrated example, the OAM layer 206 is an extension of a VMWARE VCLOUD® AUTOMATION CENTER™ (VCAC) that relies on the VCAC functionality and also leverages utilities such as VMWARE VCENTER™ LOG INSIGHT™, and VMWARE VCENTER™

HYPERIC® to deliver a single point of SDDC operations and management. The example OAM layer 206 is configured to provide different services such as health monitoring service, capacity planner service, maintenance planner service, events and operational view service, and virtual rack application workloads manager service. In some examples, a user manages an environment and associated physical and virtual resources via the OAM layer 206.

In the illustrated example of FIG. 2, the SDDC manager 125, 127 interfaces with the hypervisor 210 of the virtualization layer 204. The example SDDC manager 125, 127 communicates with the HMS 108, 114 to manage the physical hardware resources 124, 126. The example SDDC manager 125, 127 creates the example virtual server rack 106 out of underlying physical hardware resources 124, 126 that may span one or more physical racks (or smaller units such as a hyper-appliance or half rack) and handles physical management of those resources. The example SDDC manager 125, 127 uses the virtual server rack 106 as a basis of aggregation to create and provide operational views, handle fault domains, and scale to accommodate workload profiles. The example SDDC manager 125, 127 keeps track of available capacity in the virtual server rack 106, maintains a view of a logical pool of virtual resources throughout the SDDC life-cycle, and translates logical resource provisioning to allocation of physical hardware resources 124, 126.

In the illustrated example of FIG. 2, the SDDC manager 125, 127 includes the template manager 128 to improve flexibility and increase visibility to a user when generating and deploying a workload domain to a cloud computing environment, a user environment, etc., such as the virtual server rack 106. For example, the template manager 128 may direct a deployment of the workload domain 129 of FIG. 1 to the virtual server rack 106 of FIGS. 1-2 by executing the template 131 of FIG. 1.

In some examples, a user such as a data center operator 220 or an external client 222 selects a template from a template catalog 320 as described below in connection with FIG. 3. For example, the external client 222 may be an external automation client. For example, the external client 222 may be associated with an external server, an external user interface (UI) client, etc. For example, the external client 222 may be in communication with the template manager 128 via a virtual server rack (vRACK) API 224. The vRACK API 224 exposes and/or otherwise extends the virtual server rack 106 to the external client 222. In some examples, the data center operator 220 and/or the external client 222 direct the template manager 128 to retrieve the template 131 of FIG. 1 from the template catalog 320 of FIG. 3 including a plurality of templates. In some examples, the data center operator 220 and/or the external client 222 modify a template included in the template catalog 320. For example, the data center operator 220 may retrieve the template 131 from the template catalog 320 and modify the template 131 to generate a modified version of the template 131. For example, the data center operator 220 may modify the template 131 by adding or subtracting a virtual resource, changing a version and/or a configuration associated with the virtual resource, and/or alter an instruction associated with deploying the virtual resource to the virtual server rack 106.

In the illustrated example of FIG. 2, the template manager 128 generates and allocates the workload domain 129 of FIG. 1 to the virtual server rack 106 of FIG. 1 based on a selection of the template 131. In some examples, the template manager 128 executes instructions associated with the tags 133 included in the template 131 to direct an abstraction of ones of the physical hardware resources 124, 126 into virtual resources to be deployed to the workload domain 129. For example, the template manager 128 may instruct the network virtualizer 212 to virtualize and allocate the first management switch 107 of the first physical rack 102 of FIG. 1 to the workload domain 129 based on instructions associated with the tags 133. In another example, the template manager 128 may instruct the storage virtualizer 218 to virtualize and allocate one or more HDDs, SSDs, etc., included in the server host nodes(5-7) 109 of the first physical rack 102 to the workload domain 129 based on instructions associated with the tags 133. In response to virtualizing and allocating the ones of the physical hardware resources 124, 126 to the workload domain 129, the example template manager 128 deploys the workload domain 129 to the virtual server rack 106.

Example components of FIG. 2 may be implemented using products developed and provided by VMware, Inc. Alternatively, some or all of such components may alternatively be supplied by components with the same and/or similar features developed and/or provided by other virtualization component developers.

Figure 3:
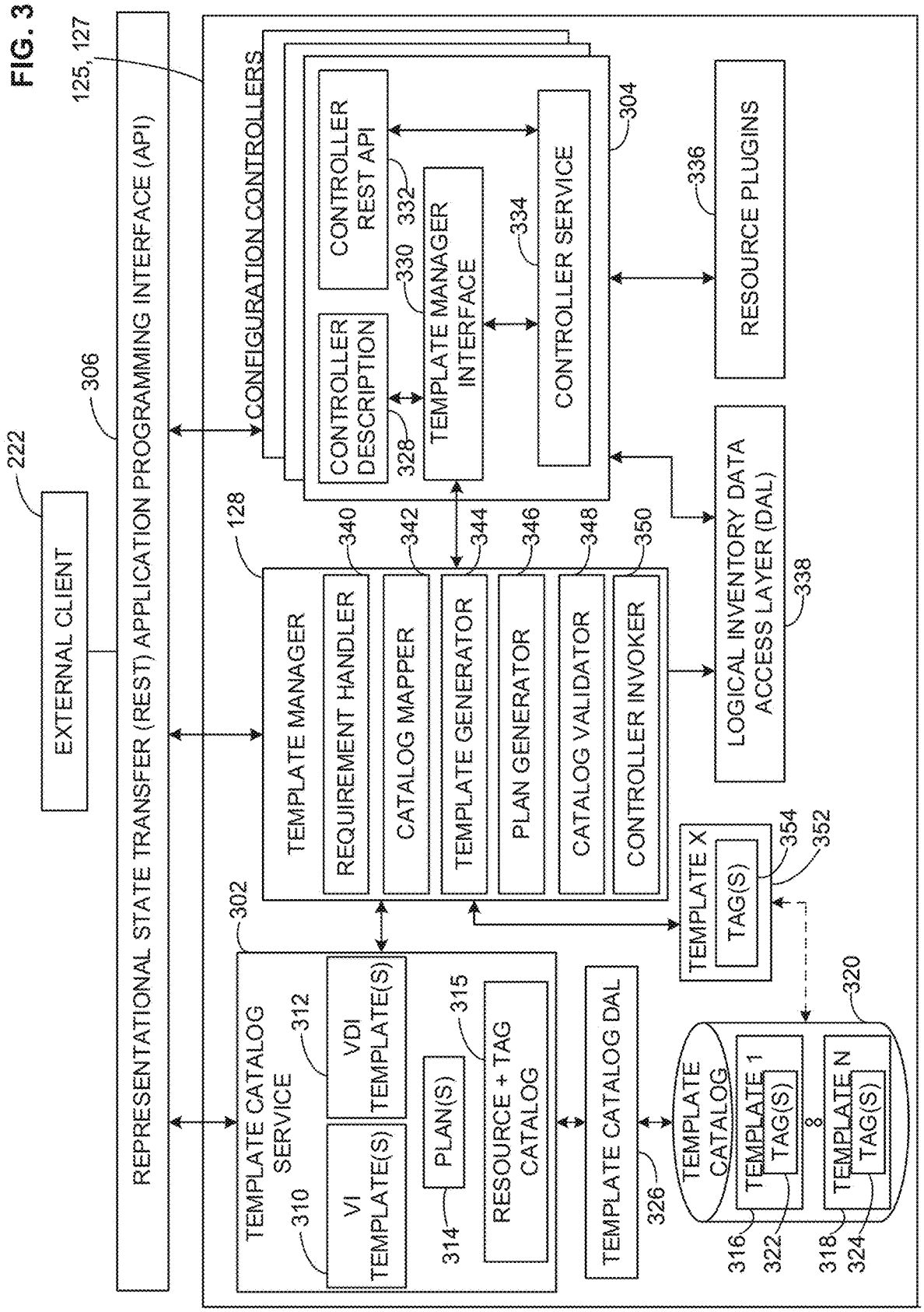
FIG. 3 is a block diagram of an example implementation of the example template manager of FIG. 2.

FIG. 3 is a block diagram of an example implementation of the example template manager 128 of FIGS. 1-2. In the illustrated example of FIG. 3, the SDDC manager 125, 127 includes the template manager 128 to manage a generation, a modification, and/or an execution of a template to deploy a workload domain. In FIG. 3, the example template manager 128 obtains a template from an example template catalog service 302 and directs a deployment of a workload domain (e.g., the workload domain 129 of FIG. 1) based on the obtained template via one or more configuration controllers 304.

In the illustrated example of FIG. 3, the template manager 128 is communicatively coupled to a representational state transfer (REST) application programming interface (API) 306 to interface with the external client 222 of FIG. 2. For example, the REST API 306 may correspond to the vRACK API 224 of FIG. 2. For example, the external client 222 external to the virtual server rack 106 of FIG. 1 may interface with the template manager 128, the template catalog service 302, and/or one or more configuration controllers 304 via the REST API 306. In FIG. 3, the example REST API 306 is a hypertext transfer protocol (HTTP) interface. For example, the REST API 306 may be an API that uses HTTP requests to perform a GET, PUT, POST, and/or DELETE operation. For example, the external client 222 may use the REST API 306 to perform a GET operation to retrieve information associated with a resource, a PUT operation to change a state of or update the resource, a POST operation to create the resource, a DELETE operation to remove the resource, etc. In such an example, the resource may be an abstraction of one or more of the physical hardware resources 124, 126 of FIGS. 1-2.

In the illustrated example of FIG. 3, the template catalog service 302 includes VMware Infrastructure (VI) template(s) 310, Virtual Desktop Infrastructure (VDI) template(s) 312, and plan(s) 314. In FIG. 3, the example template catalog service 302 includes one or more VI templates 310 to clone and/or migrate a VM. For example, in response to a selection of one of the VI templates 310, the SDDC manager 125, 127 may direct the VM migrator 214 of FIG. 2 to clone an existing VM included in the workload domain 129 and migrate the cloned VM to another workload domain.

In FIG. 3, the example template catalog service 302 includes one or more VDI templates 312 to deploy an operating system on a centralized server in a data center. For example, in response to a selection of one of the VDI templates 312, the SDDC manager 125, 127 may direct the hypervisor 210 to deploy a Microsoft® Windows® operating system with a specific configuration based on the selected VDI template 312 to the server host node 109(0) of the first physical rack 102.

In FIG. 3, the example template catalog service 302 includes one or more plans 314 to deploy a workload domain based on a template. In some examples, the plans 314 are generated based on templates such as a first template ("Template 1") 316 and a second template ("Template N") 318 included in an example template catalog 320. Additional detail corresponding to the example templates 316, 318 of FIG. 3 is described below in accordance with FIG. 6. Additional detail corresponding to the example plans 314 of FIG. 3 is described below in accordance with FIG. 7.

In FIG. 3, the example template catalog service 302 includes an example resource and tag catalog 315 to store one or more resources and one or more tags. For example, the resource and tag catalog 315 may include virtual resources such as a vSphere virtual resource, a vSAN virtual resource, etc. In some examples, the template manager 128 generates a template by selecting one or more resources and/or one or more tags. For example, the template manager 128 may display a plurality of resources and/or tags to the data center operator 220, the external client 222, etc. In response to a selection of one or more resources and/or one or more tags, the example template manager 128 may generate a template based on the selections.

In some examples, the plans 314 direct a deployment of the templates 316, 318 based on example tags 322, 324 such as the first tag(s) 322 and the second tag(s) 324. For example, the first template 316 may include five tags. In such an example, the plans 314 may include a plan corresponding to the first template 316 that specifies an order of execution of the five tags. The example template manager 128 may deploy the workload domain 129 based on an order of execution of the first example tags 322 included in the first example template 316. Additional detail corresponding to the example tags 322, 324 of FIG. 3 is described below in accordance with FIG. 5.

In FIG. 3, the example tags 322, 324 include a description of a virtual resource and corresponding instructions to deploy the virtual resource. For example, the tags 322, 324 may include a description including a text-based descriptor or label, a version identifier, a DNS name, an IP address, a VM name, a VM size, etc. For example, the tags 322, 324 may include instructions including commands to configure, deploy, and/or otherwise enable the virtual resource. For example, the tags 322, 324 may include instructions to deploy a vCenter server environment by invoking a PSC and a REST API.

In FIG. 3, the example template catalog service 302 interfaces with the example template catalog 320 via an example template catalog data access layer (DAL) 326. In FIG. 3, the example template catalog DAL 326 provides access to the example template catalog 320 at a high-level of abstraction. For example, the template catalog DAL 326 may return a reference to an object including attributes of the object instead of a row of data fields from a data table included in the template catalog 320.

In FIG. 3, the example template catalog 320 is a database that includes a plurality of templates including the first example template 316 and the second example template 318. Although the first example template 316 and the second example template 318 are shown in the example template catalog 320, alternatively there may be fewer or more than the example templates 316, 318 shown. Additionally or alternatively, the example template catalog 320 may include one or more of the example plans 314.

In the illustrated example of FIG. 3, the SDDC manager 125, 127 includes the one or more configuration controllers 304 to support a deployment of a workload domain. In FIG. 3, the example configuration controllers 304 are internal controllers to the example SDDC manager 125, 127 to facilitate a deployment of the example workload domain 129 of FIG. 1. For example, one of the configuration controllers 304 may be an internal controller such as a server configuration controller (e.g., a vSphere configuration controller), a storage configuration controller (e.g., a vSAN Configuration Controller), a network configuration controller (e.g., an NSX configuration controller), etc. For example, the configuration controllers 304 may instruct the hypervisor 210 to virtualize one or more of the physical hardware resources 124, 126 and deploy the virtualized resource. In other examples, the configuration controllers 304 are external controllers to the SDDC manager 125, 127 that can be used by the external client 222 to direct a virtualization of one or more of the physical hardware resources 124, 126. In some examples, the configuration controllers 304 include one or more internal controllers and one or more external controllers.

In some examples, the configuration controllers 304 perform a workload domain dynamic adjustment. For example, one of the configuration controllers 304 may expand the workload domain 129 of FIG. 1 by adding and/or otherwise allocating a computing resource, a networking resource, a storage resource, etc., to the workload domain 129. In another example, one of the configuration controllers may contract the workload domain 129 by removing and/or otherwise de-allocating a computing resource, a networking resource, a storage resource, etc., from the workload domain 129.

In some examples, the configuration controllers 304 determine a priority of a workload domain. For example, an example controller invoker 350 included in the template manager 128 may direct one of the configuration controllers 304 to query a priority of the workload domain 129. For example, the workload domain 129 may be a high priority, medium priority, or low priority workload domain. In some examples, the configuration controllers 304 determine a status of a workload domain. For example, the controller invoker 350 may direct one of the configuration controllers 304 to query a status of the workload domain 129. For example, the workload domain 129 may have a composed status corresponding to the workload domain 129 being operational and/or otherwise executing applications or workloads. In another example, the workload domain 129 may have a decomposed status corresponding to the workload domain 129 having completed an application and no longer being in use. In some examples, the status corresponds to a utilization of allocated resources. For example, the controller invoker 350 may direct one of the configuration controllers 304 to obtain a utilization of computing resources, networking resources, storage resources, etc., allocated to the workload domain 129. The example controller invoker 350 may determine that the workload domain 129 can be contracted based on the workload domain 129 having non-utilized resources.

In some examples, the configuration controllers 304 back up and/or restore a workload domain. For example, one of the configuration controllers 304 may back up the workload domain 129 of FIG. 1. In another example, one of the configuration controllers 304 may restore the workload domain 129 using a template (e.g., a template included in the template catalog 320). For example, the controller invoker 350 may determine that a new workload domain is being generated based on the first template 316 that has a higher priority than an existing workload domain. The example controller invoker 350 may direct one of the configuration controllers 304 to back up the lower priority workload domain and release resources allocated to the lower priority workload domain back to one or both physical racks 102, 104 for re-allocation to the higher priority workload domain. In some examples, the configuration controllers 304 map a backed up workload domain to a template for restoration. For example, one of the configuration controllers 304 may back up the workload domain 129, map the workload domain 129 to the first template 316, and decompose the workload domain 129 at a first time. At a second time later than the first time, one of the configuration controllers 304 may restore the workload domain 129 using the first template 316.

In FIG. 3, the example configuration controllers 304 include an example controller description 328. In some examples, the controller description 328 includes information associated with the configuration controllers 304 such as a configuration controller IP address, a configuration controller name, a configuration controller version, etc. For example, the template manager 128 may execute the first template 316, which includes instructions to be executed by one of the configuration controllers 304. The template manager 128 may determine which one of the configuration controllers 304 to execute the instructions by matching information included in the first template 316 to information included in the controller description 328. For example, the template manager 128 may instruct a storage controller included in the configuration controllers 304 based on the information included in the first template 316 to enable vSAN in the virtual server rack 106.

In some examples, the controller description 328 and/or, more generally, the one or more configuration controllers 304 is/are pre-registered with the template manager 128. For example, the template manager 128 may store the controller description 328 for the one or more configuration controllers 304. In such an example, the template manager 128 may compare information included in the first template 316 to the controller description 328 stored in the template manager 128. The example template manager 128 may determine which one of the configuration controllers 304 to invoke based on the comparison.

In FIG. 3, the example configuration controllers 304 include an example template manager interface 330 to facilitate communication between the example template manager 128 and the configuration controllers 304. In some examples, the template manager interface 330 obtains commands or instructions from the template manager 128. For example, the template manager interface 330 may receive instructions from the template manager 128 to enable a vSAN based on executing the first template 316. In some examples, the template manager interface 330 transmits information to the template manager 128. For example, the template manager interface 330 may transmit information included in the controller description 328 to the template manager 128.

In FIG. 3, the example configuration controllers 304 include an example controller REST API 332 to expose the configuration controllers 304 to the example REST API 306. For example, the external client 222 may have access to the configuration controllers 304 via the controller REST API 332. For example, the external client 222 may use the REST API 306 to access the controller REST API 332 to invoke an operation of the one or more configuration controllers 304. For example, the external client 222 may instruct the network virtualizer 212, the storage virtualizer 218, etc., of FIG. 2 by sending one or more commands, instructions, etc., to the controller REST API 332 via the REST API 306.

In FIG. 3, the example configuration controllers 304 include an example controller service 334 to invoke a controller function. In some examples, the controller service 334 invokes a controller based on the template manager 128 executing one or more of the templates 316, 318 included in the template catalog 320. For example, the controller service 334 may invoke the network virtualizer 212 of FIG. 2 to virtualize the ToR Switch A 110 of the first physical rack 102 of FIG. 1 based on the template manager 128 executing the first template 316. In another example, the controller service may invoke the storage virtualizer 218 of FIG. 2 to virtualize storage included in the first server host node(5) 109 and allocate the virtualized storage to the workload domain 129 of FIG. 1 based on the template manager 128 executing the second template 318.

In FIG. 3, the example controller service 334 and/or, more generally, the example configuration controllers 304 invoke a controller or a resource using example resource plugin(s) 336. In FIG. 3, the one or more resource plugins 336 are software components that add a specific feature to an existing component or extend a functionality of the existing component. In some examples, the resource plugins 336 correspond to components included in the hypervisor 210 of FIG. 2. For example, one of the resource plugins 336 may correspond to the network virtualizer 212 of FIG. 2, the storage virtualizer 218 of FIG. 2, etc. For example, one of the configuration controllers 304 may invoke one of the resource plugins 336 associated with the storage virtualizer 218 to virtualize a storage resource.

In FIG. 3, the example controller service 334 and/or, more generally, the example configuration controllers 304 obtain resource information via an example logical inventory DAL 338. In some examples, the logical inventory DAL 338 discovers available ones of the physical resources 124, 126 not allocated to a workload domain. In some examples, the logical inventory DAL 338 provides access to the physical hardware resources 124, 126 at a high-level of abstraction. For example, the logical inventory DAL 338 may return a reference to an object including attributes of one or more of the physical hardware resources 124, 126.

In some examples, the resource information includes an availability, capacity, and/or performance information associated with a resource of interest. For example, one of the configuration controllers 304 may obtain resource information via the logical inventory DAL 338 associated with a storage resource of the server host node(5) 109 of the first physical rack 102 including an available capacity of a storage resource, a latency of the storage resource, etc. In some examples, the resource information includes a configuration associated with the resource of interest. For example, one of the configuration controllers 304 may obtain resource information via the logical inventory DAL 338 associated with the storage resource including a type of the storage resource (e.g., the storage resource is a HDD, a SSD, etc.), a decryption/encryption configuration, etc.

In the illustrated example of FIG. 3, the template manager 128 directs a deployment of a workload domain by executing a template. For example, the template manager 128 may obtain the first template 316 via the template catalog service 302 and instructs one or more of the configuration controllers 304 to deploy the workload domain 129 of FIG. 1 by invoking the first tags 322 included in the first template 316. In FIG. 3, the example template manager 128 includes an example requirement handler 340, an example catalog mapper 342, an example template generator 344, an example plan generator 346, an example catalog validator 348, and the example controller invoker 350.

In the illustrated example of FIG. 3, the template manager 128 includes the example requirement handler 340 to obtain and/or otherwise process configurations, requirements, specifications, system information, etc. In some examples, the requirement handler 340 obtains a resource configuration and/or a system configuration. For example, the requirement handler 340 may obtain a resource configuration, a system configuration, etc., from the data center operator 220, the external client 222, etc. For example, the requirement handler 340 may obtain a resource configuration associated with a virtual resource including a DNS configuration, an NTP configuration, a decryption/encryption configuration, a version of the virtual resource, etc. In another example, the requirement handler 340 may obtain a system configuration of the virtual server rack 106 of FIGS. 1-2. For example, the requirement handler 340 may obtain a type and/or a version of a plurality of virtual resources allocated to the virtual server rack 106.

In some examples, the requirement handler 340 obtains a requirement. For example, the requirement handler 340 may obtain a requirement from the data center operator 220, the external client 222, etc. For example, the requirement handler 340 may obtain an availability, capacity, and/or a performance requirement from the external client 222. In some examples, the requirement handler 340 obtains a specification associated with a cloud computing environment. For example, the requirement handler 340 may obtain a specification corresponding to the virtual server rack 106 such as a total capacity of storage resources, a type of storage resources, a version of one or more controllers managing virtual resources, etc.

In some examples, the requirement handler 340 obtains system information (e.g., system state information) including an identification, an availability, and/or a usage of physical and/or virtual resources assigned to the virtual server rack 106 associated with the data center operator 220. For example, the system state information may include an identification of all-flash SSD storage resources, specialized hardware including graphical processor units (GPUs), security hardware such as a firewall, etc., allocated to the virtual server rack 106. In another example, the system state information may include an availability of storage capacity (e.g., 500 GB out of 3 TB storage available, etc.) associated with the virtual server rack 106. In yet another example, the system state information may include a computing resource usage (e.g., 80% of allocated GHz utilized, etc.) associated with the virtual server rack 106.

In the illustrated example of FIG. 3, the template manager 128 includes the catalog mapper 342 to facilitate template management by interfacing with the template catalog service 302. In some examples, the catalog mapper 342 queries the template catalog service 302 for one or more templates included in the template catalog 320. For example, the catalog mapper 342 may request the first template 316 from the template catalog service 302. In response to receiving the request, the example template catalog service 302 may retrieve the first example template 316 from the example template catalog 320 via the example template catalog DAL 326.

In some examples, the catalog mapper 342 displays one or more templates to the data center operator 220, the external client 222, etc. For example, the catalog mapper 342 may display the first template 316, the second template 318, etc., to the data center operator 220. In some examples, the catalog mapper 342 determines whether one of the displayed templates has been selected. For example, the catalog mapper 342 may determine that the data center operator 220 selected the first template 316 to be deployed.

In some examples, the catalog mapper 342 maps information (e.g., a configuration, a requirement, a specification, system information, etc.), to one or more of the tags 322, 324 included in the one or more templates 316, 318 to identify candidate tags for inclusion in a template, candidate templates to be displayed to a user, etc. In some examples, the catalog mapper 342 maps a configuration to one or more of the tags 322, 324. For example, the catalog mapper 342 may (1) compare a first version of a PSC to a second version of the PSC included in the first tag 322, where the first and the second versions are the same and (2) identify the first tag 322 as a candidate tag based on the comparison.

In some examples, the catalog mapper 342 maps a requirement to one or more of the tags 322, 324. For example, the catalog mapper 342 may map a capacity requirement of 2 TB to the first tag 322 based on the first tag 322 including instructions to deploy a storage controller. For example, a capacity requirement of 2 TB may indicate that a storage controller is necessary to virtualize 2 TB of storage resources.

In some examples, the catalog mapper 342 maps system information one or more of the tags 322, 324. For example, the catalog mapper 342 may map system information associated with the virtual server rack 106, where the system information includes a version of a vCenter server environment, a version of a PSC, and a version of a REST API to the second tag 324, which includes instructions to deploy the version of the vCenter server environment, the version of the PSC, and the version of the REST API. In such an example, the catalog mapper 342 may identify the second tag 324 as a candidate tag based on the mapping.

In some examples, the catalog mapper 342 maps information to a template. For example, the catalog mapper 342 may compare system information associated with the virtual server rack 106 to determine whether one of the templates 316, 318 stored in the template catalog 320 can be applied to the virtual server rack 106. For example, the catalog mapper 342 may determine that the virtual server rack 106 includes a vCenter server environment and a PSC. In such an example, the catalog mapper 342 may identify the second template 318 as a candidate template based on the second template 318 including instructions to deploy a vCenter server environment and a PSC.

In some examples, the catalog mapper 342 maps a template to information associated with a virtual server rack. In some examples, the catalog mapper 342 selects a template of interest to process. For example, the catalog mapper 342 may select the first template 316 to process. The example catalog mapper 342 may compare resources included in the first template 316 to the virtual server rack 106 and determine that the first template 316 can be applied to the virtual server rack 106 based on the comparison. In some examples, the catalog mapper 342 determines whether to select another template to process. For example, the catalog mapper 342 may determine to select the second template 318 to process. The example catalog mapper 342 may determine to continue selecting templates included in the template catalog 320 to process until there are no remaining unprocessed templates.

In some examples, the catalog mapper 342 filters templates that cannot be applied to a virtual server rack. For example, the catalog mapper 342 may identify the first template 316 as a candidate template, which can be applied to the virtual server rack 106, while not identifying the second template 318 as a candidate template, which cannot be applied to the virtual server rack 106. In some examples, the catalog mapper 342 determines whether at least one candidate template has been identified. In response to identifying the first example template 316 as a candidate template, the example catalog mapper 342 may display one or more candidate templates including the first template 316 to the data center operator 220, the external client 222, etc. For example, the catalog mapper 342 may filter templates that can be applied to the virtual server rack 106 and display the filtered templates to the data center operator 220, the external client 222, etc. In some examples, the catalog mapper 342 determines whether one of the filtered templates has been selected. For example, the catalog mapper 342 may determine that the data center operator 220 selected the first template 316 to deploy.

In some examples, the catalog mapper 342 generates an alert. For example, the catalog mapper 342 may generate an alert when the data center operator 220, the external client 222, etc., select a template that cannot be applied to the virtual server rack 106. For example, the alert may be a message to the data center operator 220 and/or the external client 222 indicating that the template cannot be applied to the cloud computing environment associated with the data center operator 220 and/or the external client 222. In another example, the catalog mapper 342 may generate an alert when no candidate templates have been identified. For example, the alert may be a message to the data center operator 220 and/or the external client 222 requesting that a requirement be modified to produce one or more candidate templates. In another example, the alert may be a message to the data center operator 220 and/or the external client 222 requesting that the virtual server rack 106 be modified (e.g., add, subtract, and/or modify a virtual resource included in the virtual rack 106) to produce different system information that can be used to produce one or more candidate templates.

In the illustrated example of FIG. 3, the template manager 128 includes the template generator 344 to delete, generate, or modify a template. In some examples, the template generator 344 deletes a template. For example, the template generator 344 may delete the first template 316 from the template catalog 320. In some examples, the template generator 344 generates a template. For example, the template generator 344 may generate the first template 316. For example, the template generator 344 may generate the first template 316 in response to identifying one or more candidate tags (e.g., the first tags 322) to be included in the template 316.

In FIG. 3, the example template generator 344 generates a third example template (TEMPLATE X) 352 including third example tags 354 based on modifying a template. In some examples, the template generator 344 modifies a template by selecting a template to process. For example, the template generator 344 may select the first template 316 to process. The example template generator 344 may modify the first template 316 by adding or deleting a resource, modifying a version of a resource, adding or deleting a tag, etc. In FIG. 3, the example template generator 344 may generate the third example template 352 by modifying the first example template 316. In some examples, the template generator 344 stores a modified template in the template catalog 320. For example, the template generator 344 may store the third template 352 in the template catalog 320.

In the illustrated example of FIG. 3, the template manager 128 includes the plan generator 346 to delete, generate, or modify a plan. In some the plan generator 346 deletes a plan. For example, the plan generator 346 may delete one or more of the plans 314 from the template catalog service 302, the template catalog 320, etc. In some examples, the plan generator 346 generates a plan. For example, the plan generator 346 may generate the plan 314 based on the first template 316. The example plan generator 346 may generate the plan 314 by assembling the first tags 322 and determining an order of execution of the first tags 322. In some examples, the plan generator 346 modifies a plan. For example, the plan generator 346 may modify the plan 314 by adding or deleting an instruction, modifying an order of the instructions, etc.

In the illustrated example of FIG. 3, the template manager 128 includes the catalog validator 348 to validate a template to be stored in the template catalog 320. In some examples, the catalog validator 348 validates a template by comparing the template to one or more validation rules. In some examples, the validation rules correspond to a configuration of a resource included in the template. For example, the catalog validator 348 may validate the first template 316 by comparing information included in the first template 316 to a validation rule. The example catalog validator 348 may compare a first version of a security resource included in the first example template 316 to a second version of the security resource included in a validation rule. In response to determining that the first version matches the second version, the example catalog validator 348 may validate and store the first example template 316 in the example template catalog 320. In response to determining that the first version does not match the second version, the example catalog validator 348 may generate an alert such as a message to the data center operator 220 and/or the external client 222 indicating that the first template 316 is not valid.

In some examples, the validation rules correspond to a requirement. For example, the catalog validator 348 may determine that a resource included in the first template 316 requires a license to deploy the resource. The example catalog validator 348 may compare the license to one or more licenses associated with the data center operator 220, the external client 222, etc. In response to determining that the data center operator 220, the external client 222, etc., does not have the required license included in the first example template 316, the example catalog validator 348 may neither validate nor store the first template 316 in the template catalog 320.

In some examples, the catalog validator 348 compares a template to a validated design in the template catalog 320. For example, the catalog validator 348 may identify resources and first configurations associated with the identified resources included in the first template 316. The example catalog validator 348 may identify a validated template in the template catalog 320 such as the second example template 318 that includes the resources included in the first example template 316 and second configurations associated with the resources. The example catalog validator 348 may compare the first configurations and the second configurations. In response to determining that the first and the second configurations match based on the comparison, the example catalog validator 348 may validate the first example template 316 and store the first template 316 in the example template catalog 320.

In the illustrated example of FIG. 3, the template manager 128 includes the controller invoker 350 to instruct a controller to allocate resources to a workload domain based on a template. In some examples, the controller invoker 350 generates a command or instructions to invoke one or more of the configuration controllers 304. For example, the controller invoker 350 may instruct one of the configuration controllers 304 to invoke the network virtualizer 212, the storage virtualizer 218, etc., of FIG. 2 based on executing a template. For example, the storage virtualizer 218 may virtalize and allocate one of the physical hardware resources 124, 126 to the workload domain 129 in response to receiving instructions from one of the configuration controllers 304.

In some examples, the controller invoker 350 determines whether a workload domain based on a template has been deployed. For example, the controller invoker 350 may determine that the workload domain 129 of FIG. 1 based on executing the first template 316 is deployed. In another example, the controller invoker 350 may determine that the workload domain 129 is unable to be deployed due to a power failure, a sporadic network failure, etc., which led to connectivity errors preventing the deployment of the workload domain 129. In some examples, the controller invoker 350 generates an alert. For example, the alert may be a message to the data center operator 220 and/or the external client 222 indicating that the workload domain 129 is not deployed. In response to the alert, the data center operator 220 and/or the external client 222 may override the alert by instructing the controller invoker 350 to re-trigger the deployment of the workload domain 129.

In some examples, the controller invoker 350 performs a workload domain dynamic adjustment by contracting (e.g., de-allocating a resource) or expanding a workload domain (e.g., allocating a resource). For example, the controller invoker 350 may determine that there are not enough available resources to deploy the workload domain 129 of FIG. 1. The example controller invoker 350 may access the logical inventory DAL 338 to determine if adequate computing resources, storage resources, etc., are available to be allocated to a workload domain to be generated based on one of the plans 314 of FIG. 3. In response to determining that there are resources available to deploy the workload domain 129, the example controller invoker 350 deploys the workload domain 129 based on the available resources. In response to determining that there are not enough resources available to deploy the workload domain 129, the example controller invoker 350 performs the workload domain dynamic adjustment on already deployed workload domains to free enough resources to deploy the workload domain 129.

In some examples, the controller invoker 350 contracts an identified lower priority workload domain by releasing one or more resources to be allocated to the workload domain 129. For example, the controller invoker 350 may direct one of the configuration controllers 304 to obtain a status and/or a priority of current or existing workload domains. In response to identifying a lower priority workload domain based on the status and/or the priority, the example controller invoker 350 may direct one of the configuration controllers 304 to release a resource allocated to the lower priority workload domain to be re-allocated to the workload domain 129.

In some examples, the controller invoker 350 cannot contract a lower priority workload domain. For example, the lower priority workload domain may be generated from a template that did not include one of the operation tags 611 of FIG. 6 corresponding to the workload domain being configured for autoscaling (e.g., contracting, expanding, etc.). In another example, the controller invoker 350 may determine that the lower priority workload domain does not have any spare or unused resources to be released. For example, the controller invoker 350 may determine that the workload domain does not have any unused resources based on the status of the workload domain. In some examples, the controller invoker 350 can back up the lower priority workload domain and decompose the backed up lower priority workload domain to release the resources. For example, the controller invoker 350 may direct one of the configuration controllers 304 to back up the lower priority workload domain, map the lower priority workload domain to a template for future restoration, decompose the lower priority workload domain, and re-allocate the decomposed resources to deploy the workload domain 129.

In some examples, the controller invoker 350 determines whether changes have been made to a workload domain prior to determining whether to backup the workload domain. In some examples, the controller invoker 350 determines that changes made to the workload domain are reproducible and retain an integrity of the workload domain. For example, the controller invoker 350 may compare the workload domain 129 to the first template 316 of FIG. 3 that was used to initially deploy the workload domain 129. For example, the controller invoker 350 may determine that the changes are neither reproducible nor retain the integrity of the workload domain 129 because the changes included an addition, a deletion, and/or an irreversible modification of a resource associated with the first template 316. In response to determining that the changes are not reproducible and do not retain the integrity of the workload domain 129, the controller invoker 350 can back up the workload domain 129 but not map the workload domain 129 to the first template 316.

In some examples, the controller invoker 350 determines that the changes are reproducible and retain the integrity of the workload domain 129 because the changes did not include an addition of a resource, a deletion of a resource, and/or an irreversible modification to a resource. In response to at least the determination, the template generator 344 determines whether to generate another template based on the changes. For example, the template generator 344 may generate an alert to the data center operator 220, the external client 222, etc., to provoke a decision whether to generate a new template based on the changes to the workload domain 129. For example, the data center operator 220 may determine to generate the second template 318 of FIG. 3 based on changes made to the workload domain 129. In response to generating the second template 318, the example controller invoker 350 may back up the workload domain 129 and map the workload domain 129 to the second template 318. For example, the controller invoker 350 may restore the workload domain 129 using the second template 318 as opposed to the first template 318 used to initially deploy the workload domain 129.

While an example manner of implementing the example template manager 128 of FIGS. 1-2 is illustrated in FIG. 3, one or more of the elements, processes, and/or devices illustrated in FIG. 3 may be combined, divided, re-arranged, omitted, eliminated, and/or implemented in any other way. Further, the example requirement handler 340, the example catalog mapper 342, the example template generator 344, the example plan generator 346, the example catalog validator 348, the example controller invoker 350, and/or, more generally, the example template manager 128 of FIGS. 1-2 may be implemented by hardware, software, firmware, and/or any combination of hardware, software, and/or firmware. Thus, for example, any of the example requirement handler 340, the example catalog mapper 342, the example template generator 344, the example plan generator 346, the example catalog validator 348, the example controller invoker 350, and/or, more generally, the example template manager 128 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example requirement handler 340, the example catalog mapper 342, the example template generator 344, the example plan generator 346, the example catalog validator 348, and/or the example controller invoker 350 is/are hereby expressly defined to include a non-transitory computer readable storage device or storage disk such as a memory, a digital versatile disk (DVD), a compact disk (CD), a Blu-ray disk, etc., including the software and/or firmware. Further still, the example template manager 128 of FIGS. 1-2 may include one or more elements, processes, and/or devices in addition to, or instead of, those illustrated in FIG. 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
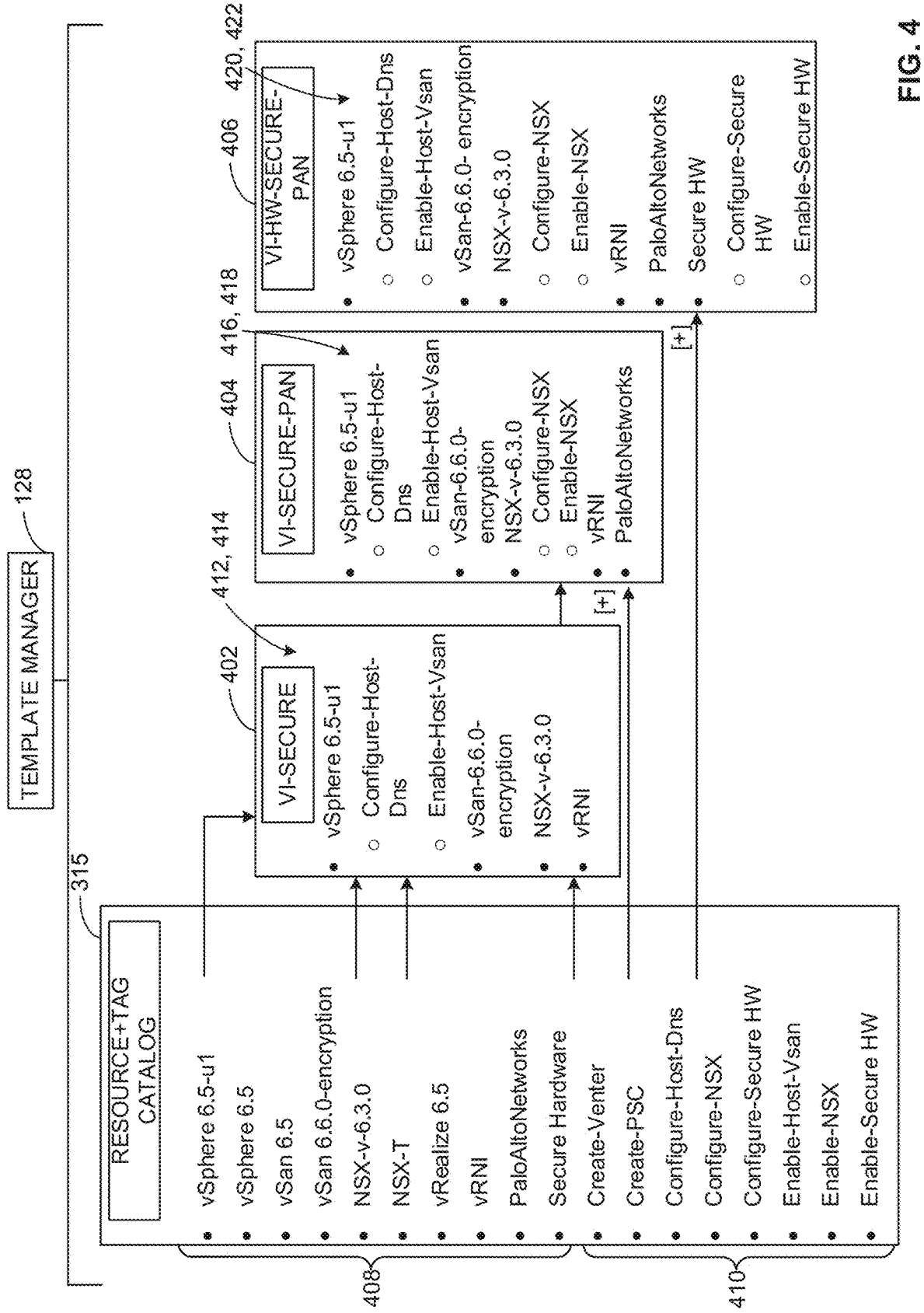
FIG. 4 illustrates example templates based on example resources included in an example resource catalog.

FIG. 4 depicts example templates 402, 404, 406 based on example resources 408 and example tags 410 included in the example resource and tag catalog 315 of FIG. 3. For example, one of the templates 402, 404, 406 may correspond to the first template 316, the second template 318, the third template 352, etc., of FIG. 3. Additionally or alternatively, the example resource and tag catalog 315 may include fewer or more resources than the example resources 408 depicted in FIG. 4. Additionally or alternatively, the example resource and tag catalog 315 may include fewer or more tags than the example tags 410 depicted in FIG. 4.

In the illustrated example of FIG. 4, the first example template 402 represents an example VMware Infrastructure Secure (VI-SECURE) template that includes first template resources 412 including virtual resources "vSphere 6.5-ul," "vSAN-6.6.0-encryption," "NSX-v-6.3.0," and "vRNI." In FIG. 4, the first example template 402 includes first example template tags 414 including tags "Configure-Host-Dns" and "Enable-Host-Vsan." In FIG. 4, the example template manager 128 generates the first example template 402 by assembling the first example template resources 412 and corresponding first example template tags 414 that are associated with the first template resources 412.

In FIG. 4, the second example template 404 represents an example VI-SECURE Palo Alto Networks (PAL) template that includes second example template resources 416 and second example template tags 418. In FIG. 4, the second example template 404 includes some resources included in the first example template resources 412 and some additional resources not included in the first template resources 412. In FIG. 4, the second example template 404 includes some tags included in the first example template tags 414 and some additional tags not included in the first template tags 414.

In FIG. 4, the third example template 406 represents an example VI Hardware (HW) Secure PAN (VI-HW-SECURE-PAN) template that includes third example template resources 420 and third example template tags 422. In FIG. 4, the third example template 406 includes some resources included in the first example template resources 412 and the second example template resources 416 and some additional resources not included in the first template resources 412 and the second template resources 416. In FIG. 4, the third example template 406 includes some tags included in the first example template tags 414 and the second example template tags 418 and some additional tags not included in the first template tags 414 and the second template tags 418.

FIG. 5 depicts an example tag 500 that may be used by the example template manager 128 of FIGS. 1-4 to deploy a workload domain. For example, the tag 500 of FIG. 5 may correspond to one of the first tags 322, one of the second tags 324, one of the third tags 354, etc., of FIG. 3. In FIG. 5, the example tag 500 includes an example tag name field 502, an example primary resource field 504, an example primary resource version field 506, and an example tag data field 508.

In FIG. 5, the example tag name field 502 is a text-based description of the example tag 500. For example, the tag name field 502 may have the structure of "<verb-virtual resource>," where the verb may be "Create," "Configure," "Enable," etc., corresponding to an action and the resource may be "Vcenter," "Psc" "Cluster," etc., corresponding to a virtual resource. For example, the tag 500 of FIG. 5 is a "Create-Vcenter" tag. For example, the template manager 128 may create a vCenter server environment virtual resource using the tag 500 of FIG. 5.

In FIG. 5, the example primary resource field 504 describes a virtual resource to be deployed when the example tag 500 is invoked. For example, the tag 500 of FIG. 5 is associated with a "Vcenter" virtual resource or a vCenter server environment. In response to executing the example tag 500, the example template manager 128 instructs the configuration controllers 304 of FIG. 3 to deploy the vCenter server environment to the virtual server rack 106. In FIG. 5, the example primary resource version field 506 is a version of the primary resource of the example tag 500. For example, the version of the "Vcenter" virtual resource of the tag 500 of FIG. 5 is "6.5.0-00000." Additionally or alternatively, the version may include characters (e.g., letters, symbols, etc.).

In FIG. 5, the example tag data field 508 includes input parameters to be used by the resource plugins 336 of FIG. 3 to deploy a virtual resource to a workload domain. In FIG. 5, the example tag data field 508 includes one or more names of VMs to be managed by the vCenter server environment, one or more IP addresses of the VMs, one or more DNS names of the VMs, etc. Alternatively, there may be fewer or more input parameters in the example tag data field 508 than depicted in FIG. 5. For example, the template manager 128 may instruct the resource plugins 336 to deploy a VM to the workload domain 129 with the name, the IP address, and the DNS name as specified in the input parameters of the tag data field 508.

In FIG. 5, the example tag 500 includes a dependent resource field 510 or a secondary resource field 510. In FIG. 5, the deployment of the "Vcenter" virtual resource depends on deploying a "Psc" resource. For example, to deploy the "Vcenter" virtual resource a "Psc" resource will need to be deployed. In FIG. 5, the example tag 500 includes an example corresponding dependent version number 512 and example dependent tag 514. Additionally or alternatively, there may be more tags than the example dependent tag 514 depicted in FIG. 5.

In FIG. 5, the example tag 500 includes a tag API 516 to execute the tag 500. In FIG. 5, the example tag API 516 includes an example API type 518, an example API action 520, and an example API URL 522. For example, the tag API 516 of FIG. 5 may use the REST API 306 of FIG. 3 to perform a POST API action. Additionally or alternatively, the example tag 500 may include fewer or more fields than depicted in FIG. 5.

FIG. 6 depicts an example template 600 that may be used by the example template manager 128 of FIGS. 1-4 to deploy a workload domain. For example, the template 600 may correspond to the first template 316, the second template 318, the third template 352, etc., of FIG. 3. In FIG. 6, the example template 600 includes an example template name field 602, an example template version field 604, an example template description field 606, an example template type field 608, an example required template field 610, and example operation tags 611. In FIG. 6, the example template name field 602 is a text-based description of the example template 600.

In FIG. 6, the example template version field 604 is a version of the example template 600. For example, the version of the "VI" template of the template 600 of FIG. 6 is "0.0.1-00000." Additionally or alternatively, the version may include characters (e.g., letters, symbols, etc.). In FIG. 6, the example template description field 606 is a text-based description of the example template 600. For example, a user may determine a capability, a function, etc., of the template 600 based on the template description field 606.

In FIG. 6, the example required template field 610 includes one or more templates that are to be executed in response to executing the example template 600. In FIG. 6, in response to executing the template 600 of FIG. 6, the template manager 128 executes the "SDDCREADY_0.0.1-00000" template. Additionally or alternatively, the example template 600 may include no templates or more templates than depicted in the example required template field 610 of FIG. 6.

In FIG. 6, the example operation tags 611 correspond to an extended function or operation of a deployed workload domain based on the example template 600. In FIG. 6, the example template manager 128 configures a workload domain based on the example template 600 to be autoscaled after deployment based on the "Configure-Autoscale" operation tag. For example, the template manager 128 may deploy the workload domain 129 of FIG. 1 by using the template 600 of FIG. 6. In response to the example template manager 128 deploying the workload domain 129, the template manager 128 can autoscale the workload domain 129 (e.g., expand, contract, etc., the workload domain 129). For example, the template manager 128 may expand the workload domain 129 and/or otherwise increase a capacity, a performance, etc., of the workload domain 129 to comply with requirements from the data center operators 220, the external client 222, etc. In another example, the template manager 128 may contract the workload domain 129 and/or otherwise decrease the capacity, the performance, etc., of the workload domain 129 when the template manager 128 determines that spare resources have been allocated to the workload domain 129.

In FIG. 6, the example template manager 128 can perform a back up operation associated with a workload domain based on the operation tag 611 (e.g., the "Enable-Backup" operation tag of FIG. 6). For example, the template manager 128 may back up a copy of the workload domain 129 of FIG. 1 after deployment. The example template manager 128 can map the example workload domain 129 to the example template 600 based on the operation tag 611. For example, the operation tag 611 may include an association or a mapping to a backed up workload domain. In such an example, the catalog mapper 342 may map the backed up workload domain to the template 600 by mapping information associated with the backed up workload domain to the operation tag 611. In some examples, the template manager 128 can decompose the workload domain 129 and restore the workload domain 129 using the template 600 based on the mapping associated with the operation tag 611.

In FIG. 6, the example template 600 includes a first resource field 612, a first resource version field 614, and a first tag field 616 including a first set of tags 618. In FIG. 6, the example template 600 also includes a second resource field 620, a second resource version field 622, and a second tag field 624 including a second set of tags 626. In FIG. 6, the example template 600 further includes a third resource field 628, a third resource version field 630, and a third tag field 632 including a third set of tags 634. The first, second, and third example resource fields 612, 620, 628 represents virtual resources that may be deployed to the workload domain 129 when the example template 600 is executed by the example template manager 128. Additionally or alternatively, there may be fewer or more tags than depicted in the first example tag field 616, the second example tag field 624, and the third example tag field 632.

Figure 7:
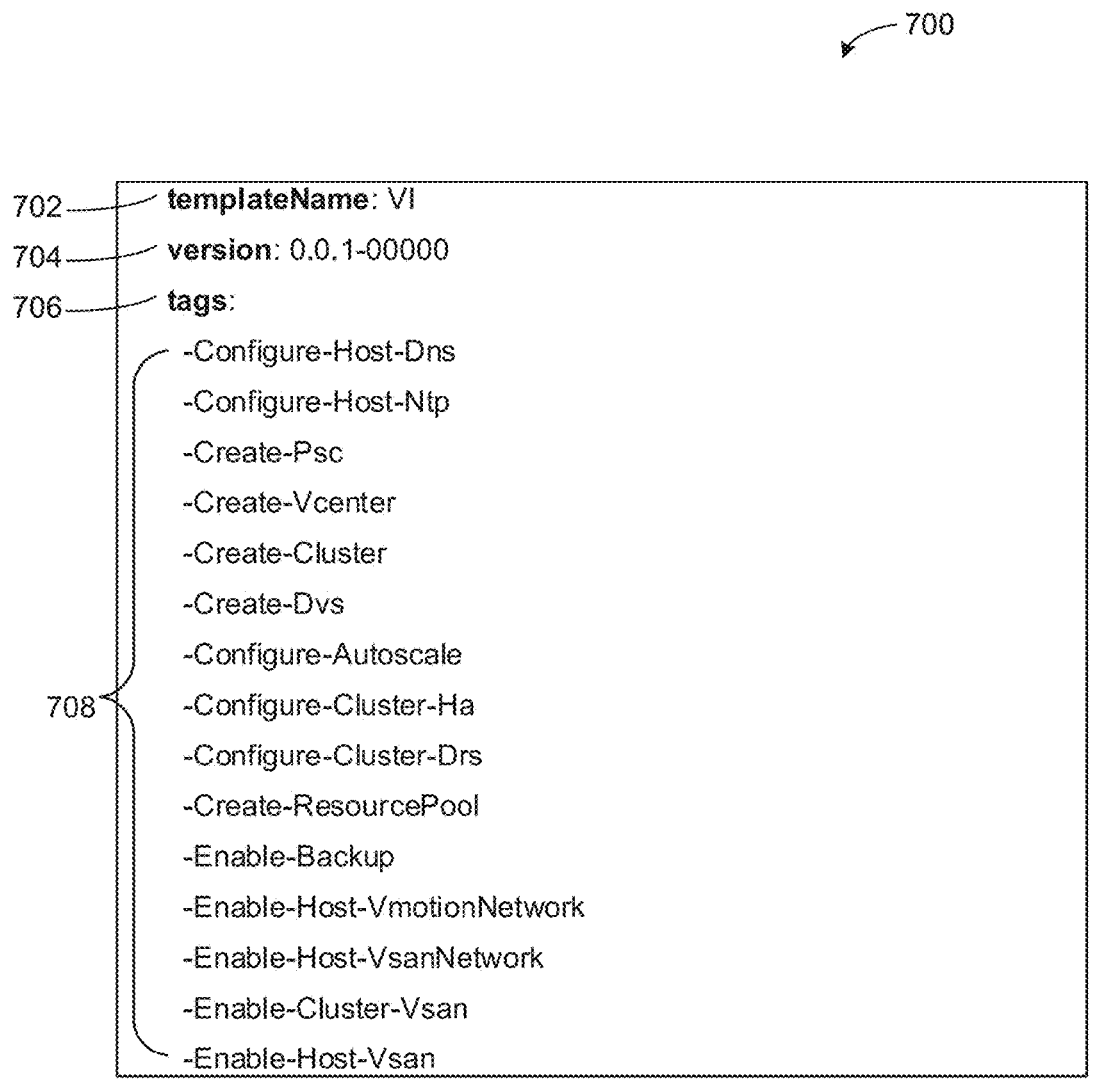
FIG. 7 depicts an example plan that may be used by the example template manager of FIG. 2 to implement the examples disclosed herein.

FIG. 7 depicts an example plan 700 that may be used by the example template manager 128 of FIGS. 1-4 to deploy a workload domain. For example, the plan 700 may correspond to a plan included in the plans 314 of FIG. 3. In FIG. 7, the example plan 700 includes an example template name field 702, an example template version field 704, and an example tag field 706 that includes example tags 708. In FIG. 7, the example template name field 702 corresponds to a template executed by the example plan 700. In FIG. 7, the example template name field 702 corresponds to the example template name field 602 of the example template 600 of FIG. 6. Alternatively, the example template name field 702 may correspond to any other template. In FIG. 7, the example template version field 704 corresponds to a version of the template executed by the example plan 700. In FIG. 7, the example template version field 704 corresponds to the example template version field 604 of the example template 600 of FIG. 6. Alternatively, the example template name field 702 may correspond to any other template version.

In the illustrated example of FIG. 7, the tag field 706 represents an order of execution of the tags 708. For example, the template manager 128 may generate the plan 700 by assembling and/or otherwise compiling the operation tags 611, the first set of tags 618, the second set of tags 626, and the third set of tags 634 included in the template 600 of FIG. 6. The example template manager 128 may analyze tags included in the operation tags 611 and/or the first through third example sets of tags 618, 626, 634 of the example template 600 and determine an order of execution based on the analysis.

In some examples, the template manager 128 generates the order of execution of the tags 708 based on one or more rules (e.g., order execution rules). In some examples, the rules represent an execution of first actions prior to executing a second action. For example, the template manager 128 may determine that a host DNS must be configured (e.g., configured by executing a "Configure-Host-Dns" tag) prior to configuring a host NTP (e.g., configuring by executing a "Configure-Host-Ntp" tag) based on a configure host rule. In another example, the template manager 128 may determine that a PSC must be created (e.g., creating a PSC by executing a "Create-Psc" tag) prior to creating a Vcenter (e.g., creating a Vcenter by executing a "Create-Vcenter" tag) based on a create PSC rule.

Flowcharts representative of example hardware logic, machine readable instructions, hardware implemented state machines, and/or any combination thereof for implementing the example template manager 128 of FIGS. 1-4 are shown in FIGS. 8-13. The machine readable instructions may be an executable program or portion of an executable program for execution by a computer processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 8-13, many other methods of implementing the example template manager 128 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 8-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 8:
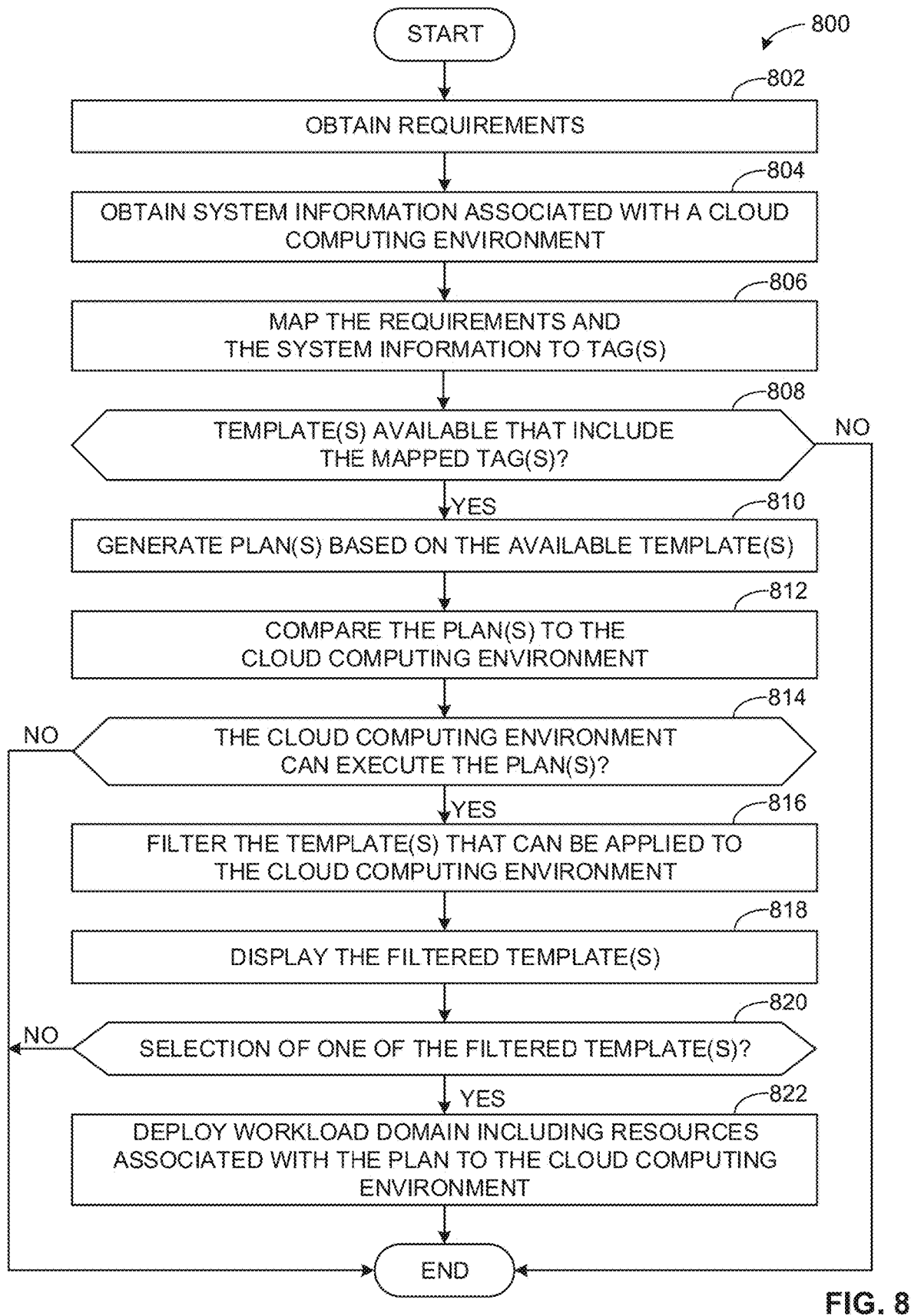
FIG. 8 is a flowchart representative of machine readable instructions which may be executed to implement the example template manager of FIGS. 2-3 to generate template recommendations to deploy a workload domain.

FIG. 8 is a flowchart representative of example machine readable instructions 800 which may be executed to implement the example template manager 128 of FIGS. 1-4 to generate template recommendations to the data center operator 220 and/or the external client 222 of FIG. 2 to deploy a workload domain. The example machine readable instructions 800 begin at block 802, at which the example template manager 128 obtains requirements. For example, the requirement handler 340 of FIG. 3 may obtain availability, capacity, performance, and/or security requirements from the data center operator 220, the external client 222 of FIG. 2, etc.

At block 804, the example template manager 128 obtains system information associated with a cloud computing environment. For example, the requirement handler 340 may obtain system information associated with the virtual server rack 106 of FIG. 1 including an available capacity, an identification of one or more virtual resources and corresponding versions, etc.

At block 806, the example template manager 128 maps the requirements and the system information to tag(s). For example, the catalog mapper 342 may map the requirements and the system information to the first tags 322 of FIG. 3 based on the first tags 322 including information associated with the requirements and/or the system information of the virtual server rack 106.

At block 808, the example template manager 128 determines whether template(s) are available that include the mapped tag(s). For example, the catalog mapper 342 may determine that the first template 316 is available based on the first template 316 including the first tags 322. In another example, if the catalog mapper 342 identified the first tags 322 and the second tags 324, then the catalog mapper 342 may determine that there is no template included in the template catalog 320 that includes the first tags 322 and the second tags 324.

If, at block 808, the example template manager 128 determines that there is not a template available that includes the mapped tag(s), the example machine readable instructions 800 end. For example, the data center operator 220 and/or the external client 222 may be notified that there are no templates available based on the requirements. In such an example, the data center operator 220 and/or the external client 222 may be requested to modify the requirements and/or modify the virtual server rack 106 to produce different system information.

If, at block 808, the example template manager 128 determines that one or more templates are available that includes the mapped tag(s), then, at block 810, the template manager 128 generates plan(s) based on the available template(s). For example, the plan generator 346 may generate the plan 700 of FIG. 7 that includes the first tags 322 based on the first tags 322 satisfying the requirements and the system information.

In response to generating the plan(s) based on the available template(s), the example template manager 128 compares the plan(s) to the cloud computing environment at block 812. For example, the catalog mapper 342 may compare the tags 708 included in the plan 700 to the virtual resources associated with the virtual server rack 106 and determine whether the virtual resources can execute the tags 708.

At block 814, the example template manager 128 determines whether the cloud computing environment can execute the plan(s). For example, the catalog mapper 342 may determine that the virtual server rack 106 can execute the plan 700 of FIG. 7 based on the virtual server rack 106 including the virtual resources needed to execute the tags 708.

If, at block 814, the example template manager 128 determines that the cloud computing environment cannot execute the plan(s), the example machine readable instructions 800 end. For example, the user or the external client 222 may be notified that the virtual server rack 106 cannot execute the plan 700. In such an example, the data center operator 220 and/or the external client 222 may be requested to modify the requirements and/or modify the virtual server rack 106 to produce different system information.

If, at block 814, the example template manager 128 determines that the cloud computing environment can execute the plan(s), then, at block 816, the template manager 128 filters the template(s) that can be applied to the cloud computing environment. For example, the catalog mapper 342 can identify a template associated with the plan 700.

At block 818, the example template manager 128 displays the filtered template(s). For example, the catalog mapper 342 may display one or more templates included in the template catalog 320 that can produce plans that can be applied to the virtual server rack 106 while satisfying the requirements and the system information.

At block 820, the example template manager 128 determines whether one of the filtered template(s) is selected. For example, the catalog mapper 342 may determine that the first template 316 is selected to be executed by the data center operator 220 and/or the external client 222. In another example, the catalog mapper 342 may determine that a filtered template was not selected. In such an example, the data center operator 220 and/or the external client 222 may be requested to modify the requirements and/or modify the virtual server rack 106 to produce different system information to identify and display alternative templates included in the template catalog 320.

If, at block 820, the example template manager 128 determines that none of the filtered template(s) have been selected, the example machine readable instructions 800 end. If, at block 820, the example template manager 128 determines that one of the filtered template(s) has been selected, then, at block 822, the template manager 128 deploys a workload domain including resources associated with the plan to the cloud computing environment. For example, the controller invoker 350 may direct the configuration controllers 304 to invoke the network virtualizer 212, the storage virtualizer 218, etc., of FIG. 2 to deploy the workload domain 129 of FIG. 1. In response to deploying the workload domain, the example machine readable instructions 800 end.

Figure 9:
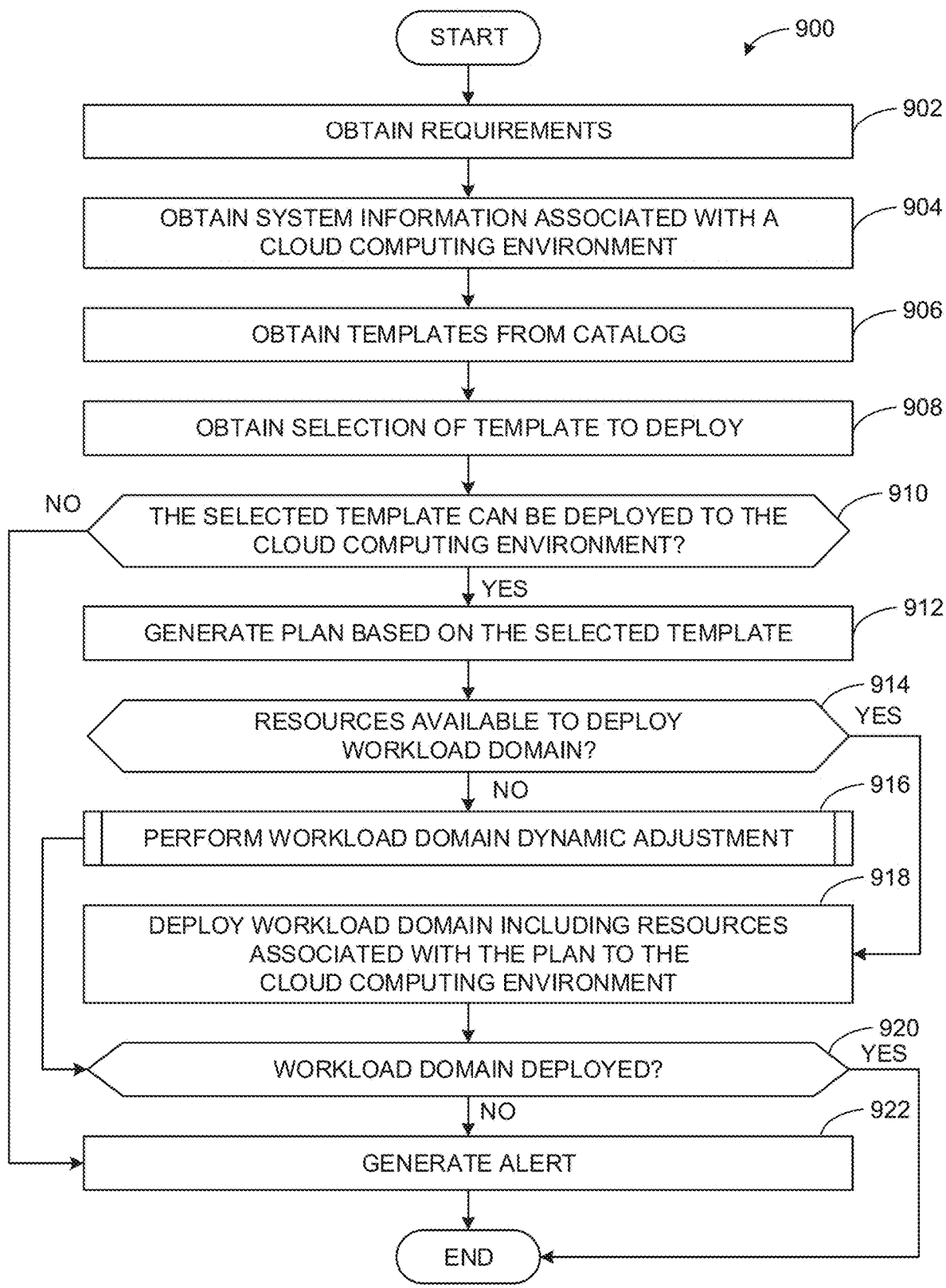
FIG. 9 is a flowchart representative of machine readable instructions which may be executed to implement the example template manager of FIGS. 2-3 to deploy an example template from an example template catalog.

FIG. 9 is a flowchart representative of example machine readable instructions 900 which may be executed to implement the example template manager 128 of FIGS. 1-4 to deploy a template from a template catalog. The example machine readable instructions 900 begin at block 902, at which the example template manager 128 obtains requirements. For example, the requirement handler 340 of FIG. 3 may obtain availability, capacity, performance, and/or security requirements from the data center operator 220 and/or the external client 222 of FIG. 2.

At block 904, the example template manager 128 obtains system information associated with a cloud computing environment. For example, the requirement handler 340 may obtain system information associated with the virtual server rack 106 of FIG. 1 including an available capacity, an identification of one or more virtual resources and corresponding versions, etc.

At block 906, the example template manager 128 obtains templates from a catalog. For example, the catalog mapper 342 may obtain one or more of the first template 316, the second template 318, etc., from the template catalog 320 of FIG. 3.

At block 908, the example template manager 128 obtains a selection of a template to deploy. For example, the catalog mapper 342 may obtain a selection of the first template 316 from the data center operator 220 and/or the external client 222.

At block 910, the example template manager 128 determines whether the selected template can be deployed to the cloud computing environment. For example, the catalog mapper 342 may determine that the first template 316 can be deployed to the virtual server rack 106 based on the virtual server rack 106 including resources capable of executing the first tags 322 included in the first template 316.

If, at block 910, the example template manager 128 determines that the selected template cannot be deployed to the cloud computing environment, control proceeds to block 918 to generate an alert. If, at block 910, the example template manager 128 determines that the selected template can be deployed to the cloud computing environment, then, at block 912, the template manager 128 generates a plan based on the selected template. For example, the plan generator 346 may generate one of the plans 314 of FIG. 3 based on assembling and/or compiling the first tags 322 included in the first template 316.

At block 914, the example template manager 128 determines whether resources are available to deploy a workload domain. For example, the controller invoker 350 may access the logical inventory DAL 338 to determine if adequate computing resources, storage resources, etc., are available to be allocated to a workload domain to be generated based on one of the plans 314 of FIG. 3.

If, at block 914, the example template manager 128 determines that resources are available to deploy the workload domain, control proceeds to block 918 to deploy the workload domain including resources associated with the plan to the cloud computing environment. For example, the controller invoker 350 may instruct the configuration controllers 304 to invoke the network virtualizer 212, the storage virtualizer 218 of FIG. 2 to deploy the workload domain 129 of FIG. 1. In response to deploying the workload domain, then, at block 920, the example template manager 128 determines whether the workload domain has been deployed.

If, at block 914, the example template manager 128 determines that resources are not available to deploy the workload domain, then, at block 916, the template manager 128 performs a workload domain dynamic adjustment. For example, the controller invoker 350 may instruct one of the configuration controllers 304 to contract a lower priority workload domain to free resources to be allocated to the workload domain 129 of FIG. 1. An example process that can be used to implement block 916 is described below in connection with FIG. 10.

In response to performing the workload domain dynamic adjustment, control proceeds to block 920 at which the example template manager 128 determines whether the workload domain is deployed. For example, the controller invoker 350 may determine that the workload domain 129 is deployed to and/or otherwise operating on the virtual server rack 106 based on executing the first template 316. In another example, the controller invoker 350 may determine that the workload domain 129 is unable to be deployed due to a power failure, a sporadic network failure, etc., which led to connectivity errors preventing the deployment of the workload domain 129. In another example, the controller invoker 350 may determine that the workload domain 129 is unable to be deployed due to a lack of available resources to deploy the workload domain 129.

If, at block 920, the example template manager 128 determines that the workload domain is deployed, the example machine readable instructions 900 end. If, at block 920, the example template manager 128 determines that the workload domain did not deploy, then, at block 922, the template manager 128 generates an alert. For example, the controller invoker 350 may generate an alert such as a message to the data center operator 220 and/or the external client 222 indicating that the workload domain 129 based on the first template 316 did not deploy. In such an example, the user, the external client 222, etc., may re-trigger the deployment process, relax a requirement or a specification, etc. In response to generating the alert, the example machine readable instructions 900 end.

Figure 10:
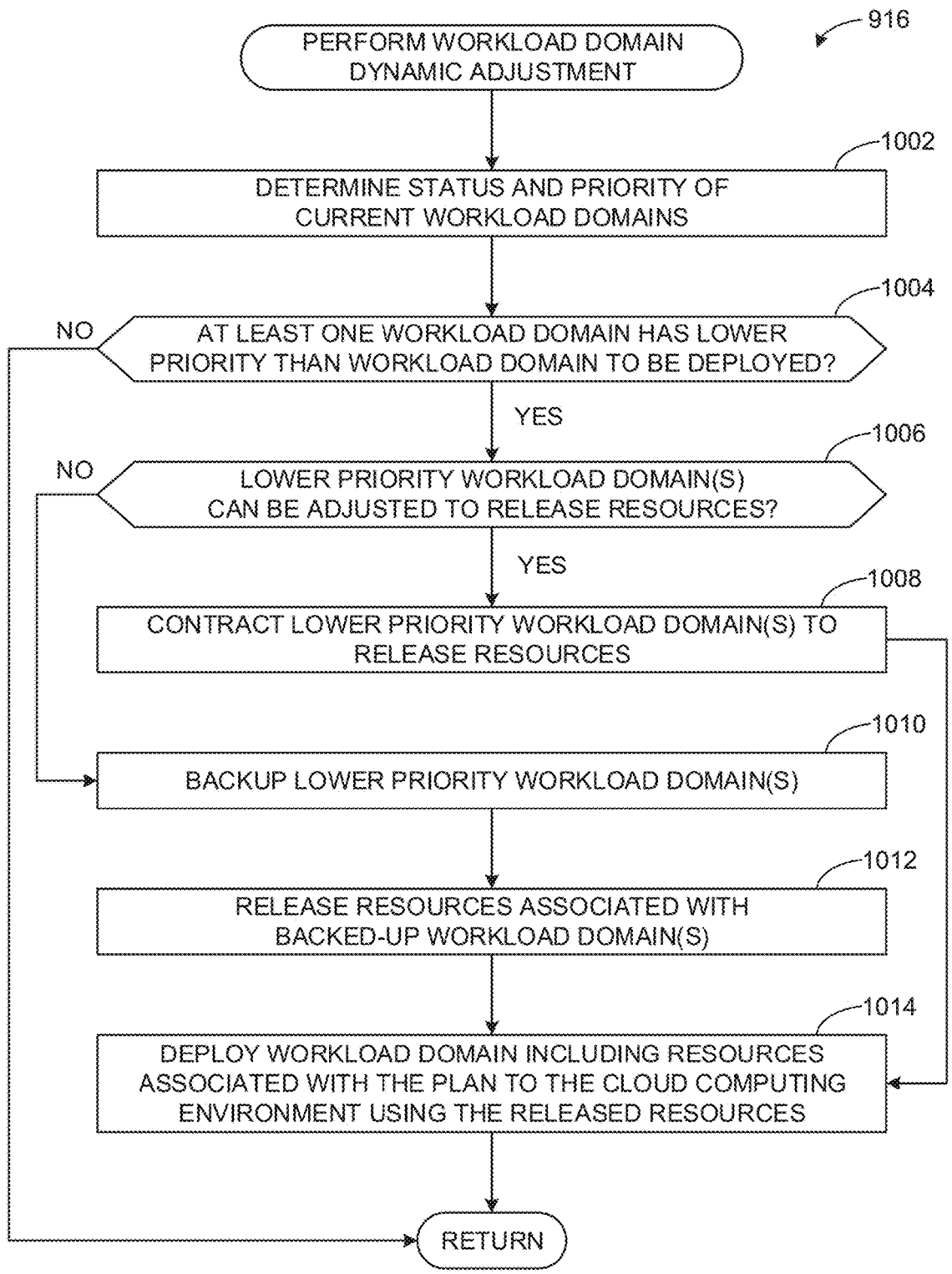
FIG. 10 is a flowchart representative of example machine readable instructions which may be executed to implement the example template manager of FIGS. 2-3 to perform a workload domain dynamic adjustment.

FIG. 10 is a flowchart representative of example machine readable instructions 916 which may be executed to implement the example template manager 128 of FIGS. 1-4 to perform a workload domain dynamic adjustment. The example machine readable instructions 916 can be used to implement block 916 of the example machine readable instructions 900 of FIG. 9. The example machine readable instructions 916 of FIG. 10 begin at block 1002, at which the example template manager 128 determines a status and a priority of current workload domains. For example, the controller invoker 350 may instruct one of the configuration controllers 304 to determine a status and a priority of workload domains in operation. For example, the controller invoker 350 may determine whether the workload domains in operation are higher or lower priority than a new workload domain being created (e.g., the workload domain 129 of FIG. 1).

At block 1004, the example template manager 128 determines whether at least one workload domain has a lower priority than the workload domain to be deployed. For example, the controller invoker 350 may determine that one or more workload domains have a lower priority than the new workload domain being created.

If, at block 1004, the example template manager 128 determines that there are no workload domains that has a lower priority than the workload domain to be deployed, control returns to block 920 of the example machine readable instructions of FIG. 9 to determine whether the workload domain has been deployed. If, at block 1004, the example template manager 128 determines that there is at least one workload domain that has a lower priority than the workload domain to be deployed, then, at block 1006, the template manager 128 determines whether the lower priority workload domain(s) can be adjusted to release resources. For example, the controller invoker 350 may determine that one or more lower priority workload domains can be contracted or downsized to release resources to be re-allocated to another workload domain.

If, at block 1006, the example template manager 128 determines that one or more lower priority workload domains can be adjusted to release resources, then, at block 1008, the template manager 128 contracts one or more of the lower priority workload domains to release resources. For example, the controller invoker 350 may direct one of the configuration controllers 304 to release a computing resource, a storage resource, etc., allocated to the lower priority workload domain back to one of the physical racks 102, 104 of FIG. 1 to be re-allocated to another workload domain.

In response to contracting the lower priority workload domain(s) to release resources, the example template manager 128 deploys a workload domain including resources associated with the plan (e.g., the plan generated at block 912 of FIG. 9) to the cloud computing environment using the released resources at block 1014. For example, the controller invoker 350 may direct one of the configuration controllers 304 to deploy the workload domain 129 of FIG. 1 based on one of the plans 314 of FIG. 3 using one or more resources released from one or more lower priority workload domains. In response to deploying the workload domain using the released resources, the example machine readable instructions 916 of FIG. 10 return to block 920 of the example machine readable instructions 900 of FIG. 9.

If, at block 1006, the example template manager 128 determines that there are no lower priority workload domains that can be adjusted to release resources, control proceeds to block 1010 to back up one or more of the lower priority workload domains. For example, the controller invoker 350 may instruct one of the configuration controllers 304 to back up one of the lower priority workload domains. In some examples, the template manager 128 maps the backed-up lower priority workload domain to a template that was used to generate the workload domain to enable a re-deployment of the backed-up workload domain using the mapped template.

At block 1012, the example template manager 128 releases resources associated with the backed-up workload domain(s). For example, the controller invoker 350 may instruct one of the configuration controllers 304 to release a computing resource, a storage resource, etc., allocated to the lower priority workload domain back to one of the physical racks 102, 104 of FIG. 1 to be re-allocated to another workload domain.

In response to releasing resources associated with the backed-up workload domain(s), the example template manager 128 deploys a workload domain including resources associated with the plan (e.g., the plan generated at block 912 of FIG. 9) to the cloud computing environment using the released resources at block 1014. For example, the controller invoker 350 may direct one of the configuration controllers 304 to deploy the workload domain 129 of FIG. 1 based on one of the plans 314 of FIG. 3 using one or more resources released from one or more lower priority workload domains. In response to deploying the workload domain using the released resources, the example machine readable instructions 916 of FIG. 10 return to block 920 of the example machine readable instructions 900 of FIG. 9.

Figure 11:
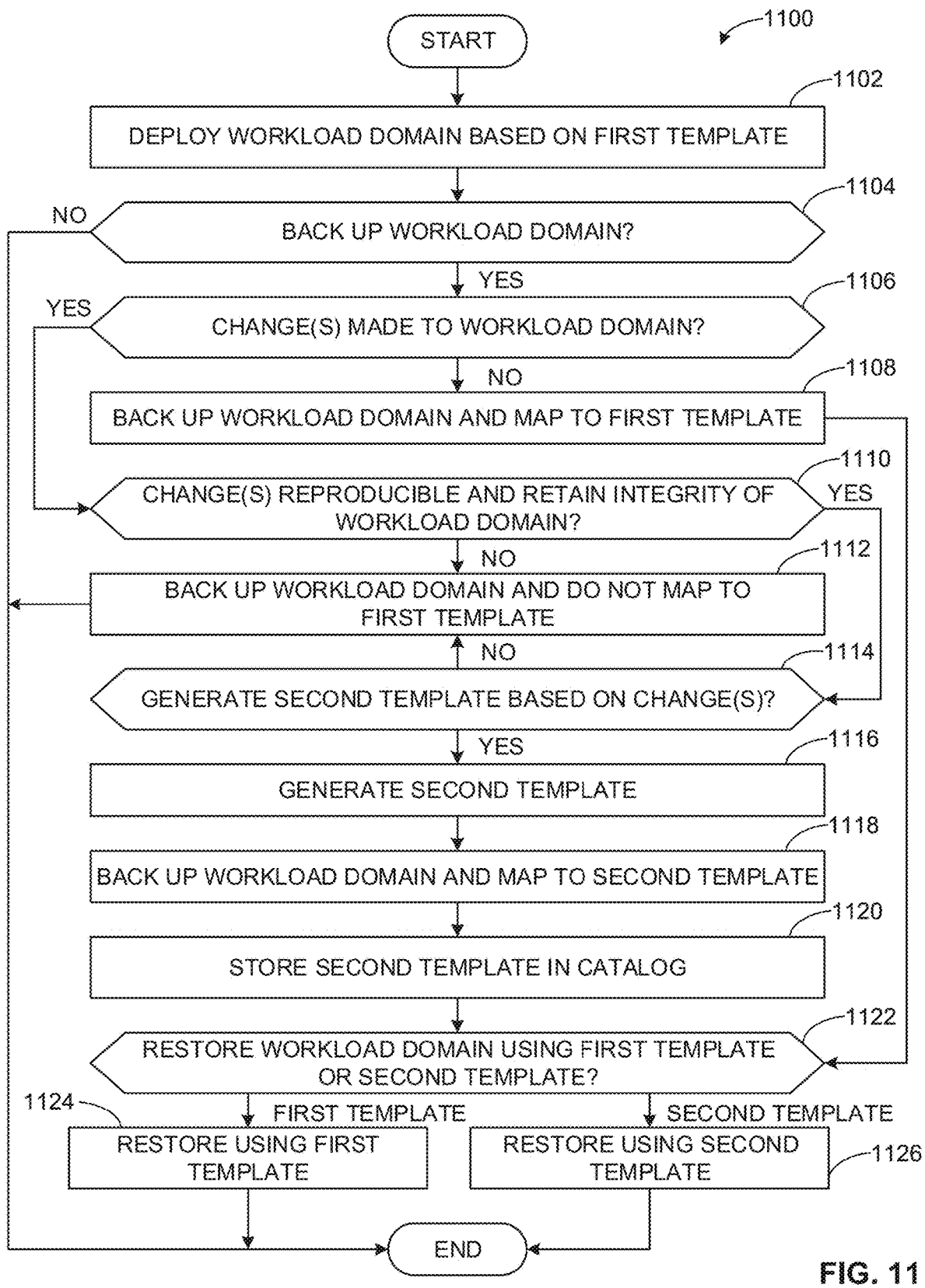
FIG. 11 is a flowchart representative of example machine readable instructions which may be executed to implement the example template manager of FIGS. 2-3 to back up and restore a workload domain based on template-driven infrastructure.

FIG. 11 is a flowchart representative of example machine readable instructions 1100 which may be executed to implement the example template manager 128 of FIGS. 1-4 to back up and restore a workload domain based on template-driven infrastructure. The example machine readable instructions 1100 of FIG. 11 begin at block 1102, at which the example template manager 128 deploys a workload domain based on a first template. For example, the controller invoker 350 may instruct one of configuration controllers 304 to deploy the workload domain 129 of FIG. 1 by executing the first template 316 of FIG. 3. For example, the workload domain 129 may execute applications or workloads for a period of time after deployment.

At block 1104, the example template manager 128 determines whether to back up the workload domain. For example, the controller invoker 350 may instruct one of the configuration controllers 304 to back up the workload domain 129. For example, the controller invoker 350 may identify the workload domain 129 has a lower priority workload domain compared to a new workload domain being generated. In such an example, the controller invoker 350 may determine to decompose the workload domain 129 to release the resources associated with the workload domain 129 to the new workload domain.

If, at block 1104, the example template manager 128 determines not to back up the workload domain, the example machine readable instructions 1100 of FIG. 11 conclude. If, at block 1104, the example template manager 128 determines to back up the workload domain, then, at block 1106, the template manager 128 determines whether change(s) were made to the workload domain. For example, the controller invoker 350 may compare the workload domain 129 to the first template 316 of FIG. 3 used to deploy the workload domain 129. For example, the controller invoker 350 may determine that changes were made to the workload domain 129 such as an addition, deletion, and/or a modification of a resource associated with the first template 316.

If, at block 1106, the example template manager 128 determines that change(s) were not made to the workload domain, then, at block 1108, the template manager 128 backs up the workload domain and maps to the first template. For example, the controller invoker 350 may direct one of the configuration controllers 304 to back up the workload domain 129 and map the workload domain 129 to the first template 316. For example, the catalog mapper 342 may map the operation tag 611 included in the first template 316 to the backed up workload domain. In such an example, mapping the workload domain 129 to the first template 316 can enable the template manager 128 to restore the workload domain 129 by executing the first template 316. In response to backing up the workload domain and mapping to the first template, control proceeds to block 1122 to determine whether to restore the backed-up workload domain using the first template or a second template.

If, at block 1106, the example template manager 128 determines that change(s) were made to the workload domain, control proceeds to block 1110 to determine whether the change(s) are reproducible and retain an integrity of the workload domain. For example, the controller invoker 350 may determine that the changes are not reproducible or retain the integrity of the workload domain 129. For example, the controller invoker 350 may compare configurations, parameters, resources, etc., of the workload domain 129 to configurations, parameters, resources, etc., defined in and/or otherwise associated with the first template 316 of FIG. 3. The example controller invoker 350 may determine that the workload domain 129 has changed due to an added resource, a deleted resource, a modified resource, etc., and/or a combination thereof. The example controller invoker 350 may determine that the changes are not reproducible because the first template 316 does not include the changes.

If, at block 1110, the example template manager 128 determines that the change(s) are not reproducible and do not retain the integrity of the workload domain, then, at block 1112, the template manager 128 backs up the workload domain and does not map to the first template. For example, the controller invoker 350 may direct one of the configuration controllers 304 to back up the workload domain 129 and not map the workload domain 129 to the first template 316 (e.g., a mapping or a linkage of the workload domain 129 and the first template 316 can be broken). In response to backing up the workload domain and not mapping to the first template, the example machine readable instructions 1100 of FIG. 11 conclude.

If, at block 1110, the example template manager 128 determines that the change(s) are reproducible and retain the integrity of the workload domain, control proceeds to block 1114 to determine whether to generate a second template based on the changes. For example, the template generator 344 may generate an alert to the data center operators 220, the external client 222, etc., to provoke a decision whether to generate a new template based on the changes to the workload domain 129. For example, the data center operator 220 may determine to generate the second template 318 of FIG. 3 based on changes made to the workload domain 129.

If, at block 1114, the example template manager 128 determines not to generate the second template based on the change(s), then, at block 1112, the example template manager 128 back ups the workload domain and does not map to the first template. If, at block 1114, the example template manager 128 determines to generate the second template based on the change(s), then, at block 1116, the template manager 128 generates the second template. For example, the template generator 344 may generate the second template 318 in response to the data center operator 220 determining to generate the second template 318 based on the changes to the workload domain 129.

In response to generating the second template, the example template manager 128 back ups the workload domain and maps to the second template at block 1118. For example, the controller invoker 350 may back up the workload domain 129 of FIG. 1 and map the workload domain 129 to the second template 318 of FIG. 3. For example, the catalog mapper 342 may map the operation tag 611 included in the second template 318 to the backed up workload domain. In such an example, the controller invoker 350 may release one or more resources allocated to the workload domain 129 back to one or both physical racks 102, 104 of FIG. 1 to be re-allocated to another workload domain. In response to backing up the workload domain and mapping to the second template, then, at block 1120, the example template manager 128 stores the second template in a catalog. For example, the template generator 344 may store the second template 318 in the template catalog 320 of FIG. 3.

At block 1122, the example template manager 128 determines whether to restore the workload domain using the first template or the second template. For example, the controller invoker 350 may determine to restore the workload domain 129 using the first template 316 based on input from the data center operators 220, the external client 222, etc. For example, the controller invoker 350 may restore the workload domain 129 using the same template that initially deployed the workload domain 129. In another example, the controller invoker 350 may determine to restore the workload domain 129 using the second template 318 that was generated based on reproducible changes made to the workload domain 129 during operation.

If, at block 1122, the example template manager 128 determines to restore the workload domain using the first template, then, at block 1124, the template manager 128 restores the workload domain using the first template. For example, the controller invoker 350 may re-deploy the workload domain 129 of FIG. 1 by executing instructions included in the first template 316. In response to restoring the workload domain using the first template, the example machine readable instructions 1100 of FIG. 11 conclude.

If, at block 1122, the example template manager 128 determines to restore the workload domain using the second template, then, at block 1126, the template manager 128 restores the workload domain using the second template. For example, the controller invoker 350 may re-deploy the workload domain 129 of FIG. 1 by executing instructions included in the second template 318. In response to restoring the workload domain using the second template, the example machine readable instructions 1100 of FIG. 11 conclude.

Figure 12:
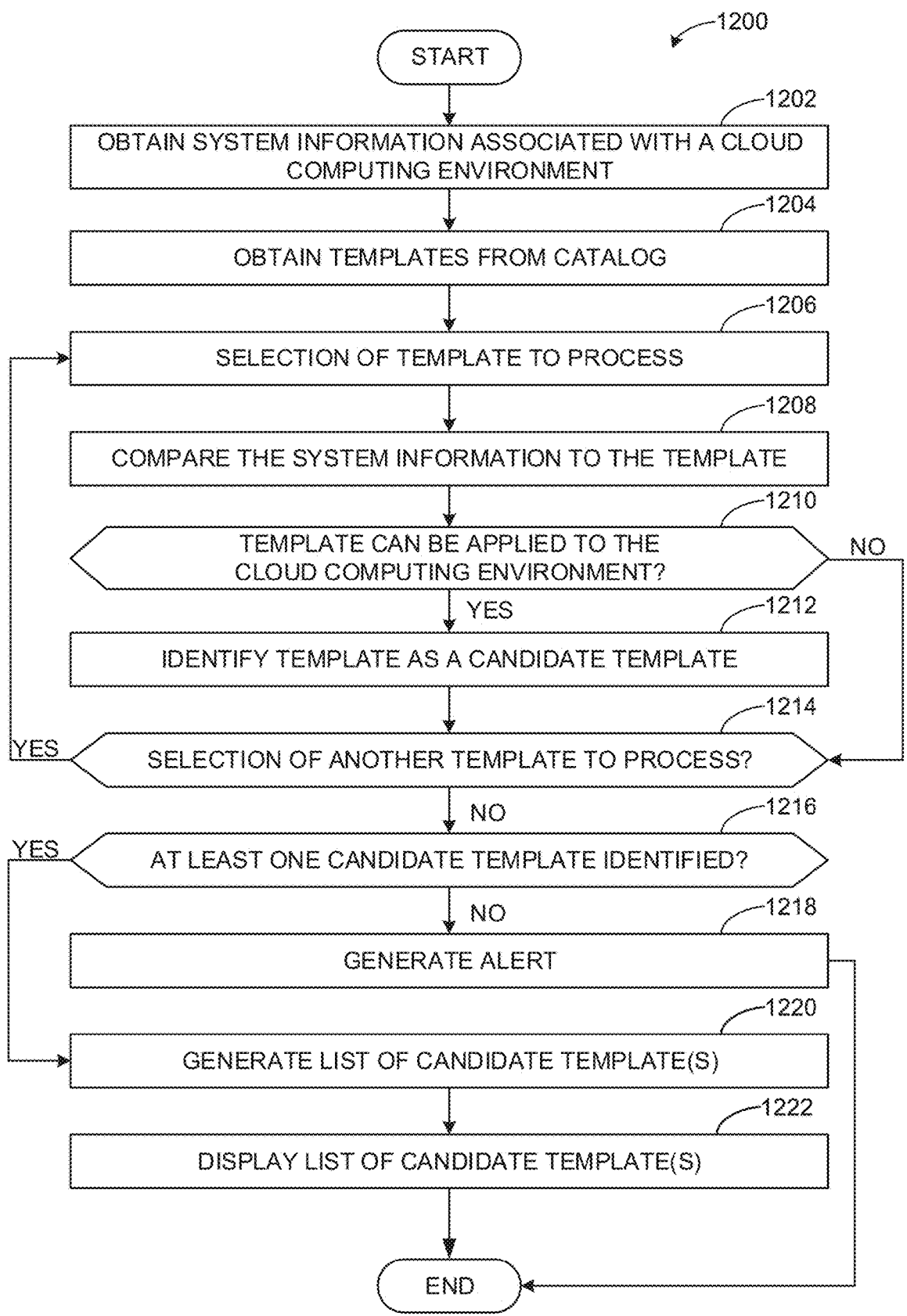
FIG. 12 is a flowchart representative of machine readable instructions which may be executed to implement the example template manager of FIGS. 2-3 to identify example compatible templates for an example cloud computing environment.

FIG. 12 is a flowchart representative of example machine readable instructions 1200 which may be executed to implement the example template manager 128 of FIGS. 1-4 to identify compatible templates for a cloud computing environment. The example machine readable instructions 1200 begin at block 1202, at which the example template manager 128 obtains system information associated with a cloud computing environment. For example, the requirement handler 340 may obtain system information associated with the virtual server rack 106 of FIG. 1 including an available capacity, an identification of one or more virtual resources and corresponding versions, etc.

At block 1204, the example template manager 128 obtains templates from a catalog. For example, the catalog mapper 342 may obtain the first template 316, the second template 318, etc., from the template catalog 320 of FIG. 3.

At block 1206, the example template manager 128 selects a template to process. For example, the catalog mapper 342 may select the first template 316 to process.

At block 1208, the example template manager 128 compares the system information to the template. For example, the catalog mapper 342 may compare an identification, an availability, and/or a usage of the physical hardware resources 124, 126 and/or virtual resources assigned to the virtual server rack 106 of FIG. 1 to the first template 316.

At block 1210, the example template manager 128 determines whether the template can be applied to the cloud computing environment. For example, the catalog mapper 342 may determine that the first template 316 can be applied to the virtual server rack 106 based on the virtual server rack 106 including virtual resources that can execute the first tags 322 included in the first template 316. In such an example, the catalog mapper 342 may identify the first template 316 as a candidate template that can be applied to the virtual server rack 106.

If, at block 1210, the example template manager 128 determines that the template cannot be applied to the cloud computing environment, control proceeds to block 1214 to determine whether to select another template to process. If, at block 1210, the example template manager 128 determines that the template can be applied to the cloud computing environment, then, at block 1212, the template manager 128 identifies the template as a candidate template. For example, the catalog mapper 342 may identify the first template 316 as a candidate template that can be applied to the virtual server rack 106.

In response to identifying the template as a candidate template, the example template manager 128 determines whether to select another template to process at block 1214. For example, the catalog mapper 342 may determine to select the second template 318 to process. The example catalog mapper 342 may continue to select templates included in the example template catalog 320 until all templates included in the template catalog 320 have been processed.

If, at block 1214, the example template manager 128 determines to select another template to process, control returns to block 1206 to select another template to process. If, at block 1214, the example template manager 128 determines not to select another template to process, then, at block 1216, the template manager 128 determines whether at least one candidate template has been identified. For example, the catalog mapper 342 may determine that at least the first template 316 has been identified.

If, at block 1216, the example template manager 128 determines that no candidate templates have been identified, then, at block 1218, the template manager 128 generates an alert. For example, the controller invoker 350 may generate an alert such as a message to the data center operator 220 and/or the external client 222 indicating that there are no applicable templates that can be applied to the virtual server rack 106. In such an example, the data center operator 220 and/or the external client 222 may modify the virtual server rack 106 to generate new system information that can be applicable to one or more templates included in the template catalog 320. In response to generating the alert, the example machine readable instructions 1200 end.

If, at block 1216, the example template manager 128 determines that at least one candidate template has been identified, control proceeds to block 1220 to generate a list of candidate template(s). In response to generating the list of candidate templates, then, at block 1222, the example template manager 128 displays the list of candidate templates. For example, the catalog mapper 342 may display at least the first template 316 to the data center operator 220 and/or the external client 222. The display of at least the first template 316 indicates to the data center operator 220 and/or the external client 222 that the first template 316 is a recommended template based on the system information associated with the virtual server rack 106. In response to displaying the list of candidate template(s), the example machine readable instructions 1200 end.

Figure 13:
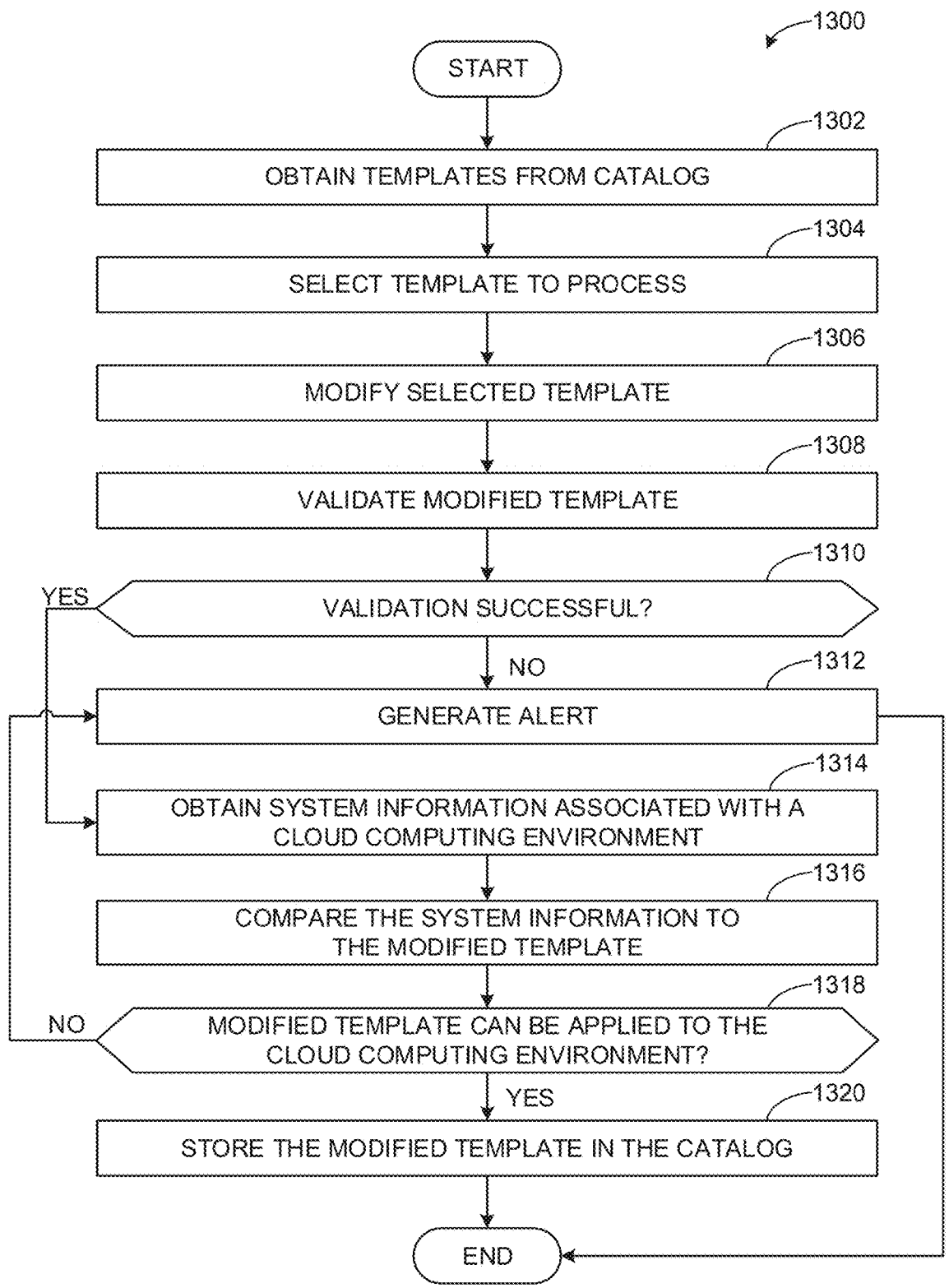
FIG. 13 is a flowchart representative of machine readable instructions which may be executed to implement the example template manager of FIGS. 2-3 to modify an example template from an example template catalog.

FIG. 13 is a flowchart representative of example machine readable instructions 1300 which may be executed to implement the example template manager 128 of FIGS. 1-4 to modify a template from a template catalog. The example machine readable instructions 1300 begin at block 1302, at which the example template manager 128 obtains templates from a catalog. For example, the catalog mapper 342 may obtain the first template 316, the second template 318, etc., from the template catalog 320 of FIG. 3.

At block 1304, the example template manager 128 selects a template to process. For example, the template generator 344 may select the first template 316 to process.

At block 1306, the example template manager 128 modifies the selected template. For example, the template generator 344 may generate the third template 352 of FIG. 3 by adding and/or deleting one or more of the first tags 322 of the first template 316. In another example, the template generator 344 may generate the third template 352 by modifying one or more of the first tags 322 of first template 316. For example, the template generator 344 may revise the tag name field 502, the primary resource field 504, the primary resource version field 506, the example tag data field 508, etc., of FIG. 5 and/or a combination thereof associated with one or more of the first tags 322.

At block 1308, the example template manager 128 validates the modified template. For example, the catalog validator 348 may compare a first version of a security resource included in the third template 352 to a second version of the security resource included in a validation rule. In response to determining that the first version matches the second version, the example catalog validator 348 may validate and store the third example template 352 in the example template catalog 320.

At block 1310, the example template manager 128 determines whether the validation is successful. For example, the catalog validator 348 may determine that the validation is successful based on the first version of the security resource included in the third template 352 matching the second version included in the validation rule.

If, at block 1310, the example template manager 128 determines that the validation is not successful, then, at block 1312, the template manager 128 generates an alert. For example, the catalog validator 348 may generate an alert such as displaying a message to the data center operator 220 and/or the external client 222 of FIG. 2 indicating that the third template 352 failed validation. In response to generating the alert, the example machine readable instructions 1300 end.

If, at block 1310, the example template manager 128 determines that the validation is successful, control proceeds to block 1314 to obtain system information associated with a cloud computing environment. For example, the requirement handler 340 may obtain system information associated with the virtual server rack 106 of FIG. 1 including an available capacity, an identification of one or more virtual resources and corresponding versions, etc.

In response to obtaining the system information associated with the cloud computing environment, the example template manager 128 compares the system information to the third template 352 at block 1316. For example, the catalog mapper 342 may compare the system information associated with the virtual server rack 106 to the third template 352.

At block 1318, the example template manager 128 determines whether the modified template can be applied to the cloud computing environment. For example, the catalog mapper 342 may determine that the third template 352 can be applied to the virtual server rack 106 based on the comparison of the system information to the third template 352.

If, at block 1318, the example template manager 128 determines that the modified template cannot be applied to the cloud computing environment, control returns to block 1312 to generate an alert. For example, the catalog mapper 342 may generate an alert to the data center operator 220 and/or the external client 222 indicating that the third template 352 cannot be applied to the virtual server rack 106. In some examples, the data center operator 220 and/or the external client 222 can override the catalog mapper 342 by instructing the controller invoker 350 to deploy the third template 352. In response to generating the alert, the example machine readable instructions 1300 end.

If, at block 1318, the example template manager 128 determines that the modified template can be applied to the cloud computing environment, then, at block 1320, the template manager 128 exports the modified template to the catalog. For example, the template generator 344 may store the third template 352 in the template catalog 320. In response to storing the third template 352 in the catalog, the example machine readable instructions 1300 end.

Figure 14:
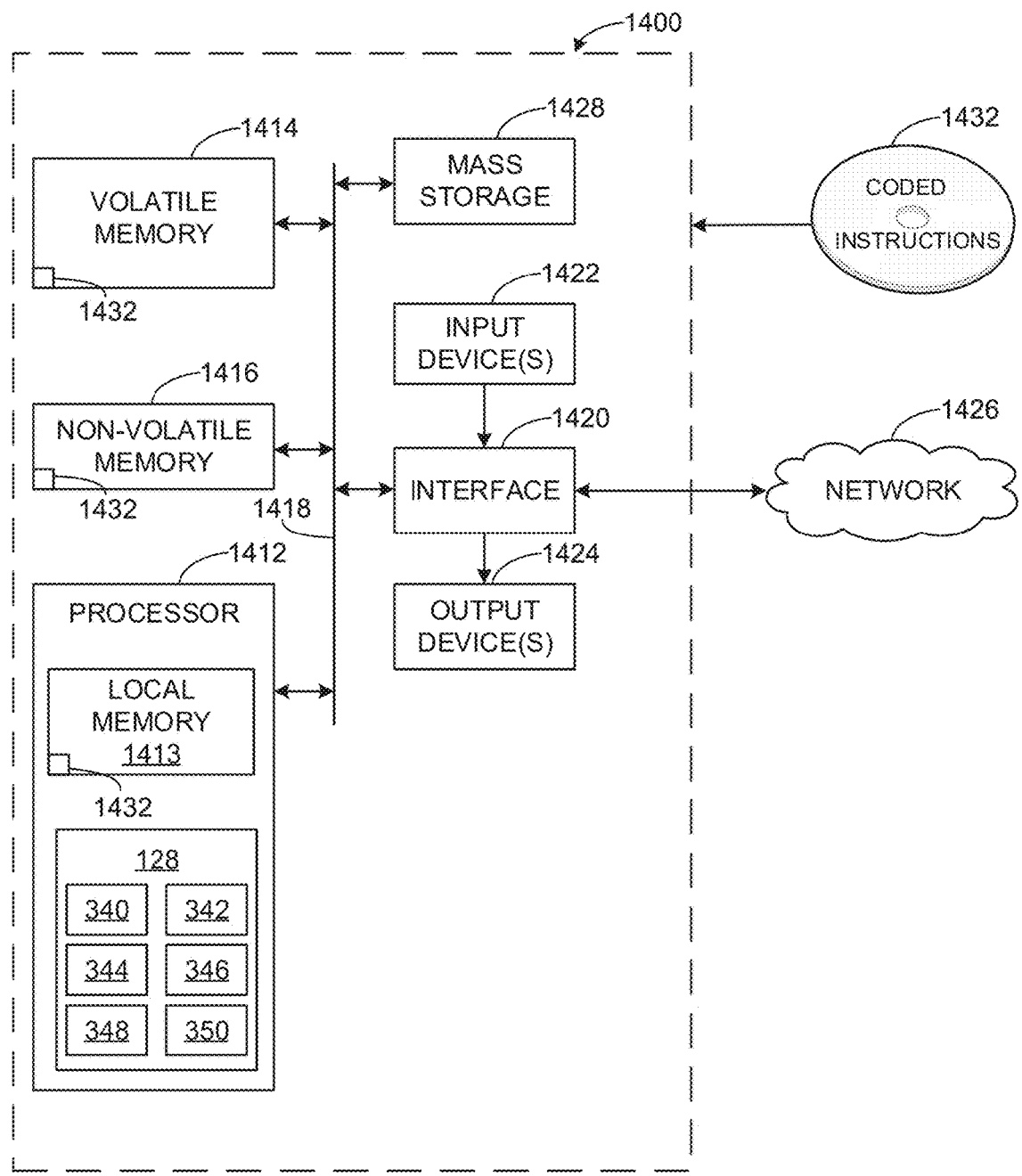
FIG. 14 is a block diagram of an example processing platform structured to execute the instructions of FIGS. 8-13 to implement the example template manager of FIGS. 2-3.

FIG. 14 is a block diagram of an example processor platform 1200 structured to execute the instructions of FIGS. 8-13 to implement the example template manager 128 of FIGS. 1-4. The processor platform 1400 can be, for example, a server, a personal computer, a workstation, a self-learning machine (e.g., a neural network), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1412 implements the example requirement handler 340, the example catalog mapper 342, the example template generator 344, the example plan generator 346, the example catalog validator 348, the example controller invoker 350 of FIG. 3 and/or, more generally, the template manager 128 of FIGS. 1-4.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) 1422 can be implemented by, for example, a keyboard, a button, a mouse, a touchscreen, a track-pad, a trackball, an isopoint device, and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, etc. The interface circuit 1420 of the illustrated example, thus, typically includes a graphics driver card, a graphics driver chip, and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIGS. 8-13 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus, and articles of manufacture have been disclosed to provision template-driven infrastructure to improve an efficiency of deploying a workload domain to execute an application using a virtualized server. In the above-disclosed examples, a virtualized server can be composed using one or more pooled hardware resources based on executing instructions associated with a template to meet user requirements. For example, the virtualized server can be composed based on executing a plan including tags structured to allocate and deploy a plurality of resources to a workload domain. By executing the tags, a workload domain can be composed using validated components of appropriate versions that allows future modifications or upgrades to be applied to the workload domain without risking rendering the workload domain inoperable from pushing an incompatible modification or upgrade.

In the above-disclosed examples, a template-driven approach to allocating and deploying a pooled hardware resource improves an efficiency of maximizing a return on infrastructure investment by allocating pooled hardware resources to one or more workload domains based on improved visibility to not only high-level but also low-level configurations, specifications, etc., of the pooled hardware resources and corresponding virtual resources.

In the above-disclosed examples, a workload domain can be deployed faster than in prior implementations based on a selection of a template included in a template catalog. In the above-disclosed examples, a workload domain can be deployed to improve an efficiency of a cloud computing environment associated with a user by modifying an existing template or generating a new template using resources and tags included in the template catalog to align with user needs, requirements, and specifications more closely.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus comprising:
    a catalog mapper to:
       map a requirement and system information to a first tag, the system information associated with a cloud computing environment, the first tag including first instructions to deploy a first virtual resource corresponding to physical hardware; and
       identify a template based on the mapping, the template including the first tag;
    a plan generator to generate a plan based on the template to generate a first workload domain having a first priority, the plan including an order of execution of tags including the first tag to deploy virtual resources including the first virtual resource to the cloud computing environment; and
    a controller invoker to:
       determine whether or not a first physical hardware resource is available to generate the first workload domain;
       in response to determining that the first physical hardware resource is not available to generate the first workload domain, release a second physical hardware resource from a second workload domain having a second priority less than the first priority; and
       deploy the first workload domain to the cloud computing environment based on the plan by executing second instructions associated with the tags included in the template, the first workload domain to include at least one of the first physical hardware resource or the second physical hardware resource.

2. The apparatus of claim 1, wherein the requirement includes an availability requirement, a capacity requirement, a performance requirement, or a security requirement.

3. The apparatus of claim 1, wherein the system information includes at least one of an identification of a second virtual resource included in the cloud computing environment, a version of the second virtual resource, an availability of the second virtual resource, or a usage of the second virtual resource.

4. The apparatus of claim 1, wherein the first tag includes a tag name field, a primary resource field, a primary resource version field, a tag data field, and a dependent resource field.

5. The apparatus of claim 4, wherein the dependent resource field identifies the first virtual resource, a version of the first virtual resource, and the first instructions to deploy the first virtual resource to the first workload domain.

6. The apparatus of claim 1, wherein the template includes a template name field, a template version field, a template description field, a template type field, and a required template field.

7. The apparatus of claim 1, wherein the template includes a resource field, a resource version field, and a tag field including the tags representing the second instructions to deploy one or more of the virtual resources associated with the resource field.

8. A method comprising:
    mapping a requirement and system information to a first tag, the system information associated with a cloud computing environment, the first tag including first instructions to deploy a first virtual resource corresponding to physical hardware;
    identifying a template based on the mapping, the template including the first tag;
    generating a plan based on the template to generate a first workload domain having a first priority, the plan including an order of execution of tags including the first tag to deploy virtual resources including the first virtual resource to the cloud computing environment;
    determining whether or not a first physical hardware resource is available to generate the first workload domain;
    in response to determining that the first physical hardware resource is not available to generate the first workload domain, releasing a second physical hardware resource from a second workload domain having a second priority less than the first priority; and
    deploying the first workload domain to the cloud computing environment based on the plan by executing second instructions associated with the tags included in the template, the first workload domain including at least one of the first physical hardware resource or the second physical hardware resource.

9. The method of claim 8, wherein the requirement includes an availability requirement, a capacity requirement, a performance requirement, or a security requirement.

10. The method of claim 8, wherein the system information includes at least one of an identification of a second virtual resource included in the cloud computing environment, a version of the second virtual resource, an availability of the second virtual resource, or a usage of the second virtual resource.

11. The method of claim 8, wherein the first tag includes a tag name field, a primary resource field, a primary resource version field, a tag data field, and a dependent resource field.

12. The method of claim 11, wherein the dependent resource field identifies the first virtual resource, a version of the first virtual resource, and the first instructions to deploy the first virtual resource to the first workload domain.

13. The method of claim 8, wherein the template includes a template name field, a template version field, a template description field, a template type field, and a required template field.

14. The method of claim 8, wherein the template includes a resource field, a resource version field, and a tag field including the tags representing the second instructions to deploy one or more of the virtual resources associated with the resource field.

15. The method of claim 8, wherein the virtual resources include the first virtual resource and a second virtual resource and the tags include the first tag and a second tag, the template including (1) the first virtual resource and the first tag including the first instructions to deploy the first virtual resource and (2) the second virtual resource and the second tag including third instructions to deploy the second virtual resource.

16. The method of claim 8, further including generating a modified template by modifying the template by at least one of adding a second tag, removing one of the tags, or modifying one of the tags.

17. The method of claim 16, further including:
validating the modified template by comparing the modified template to at least one of a validation rule or a validated template included in a template catalog; and
in response to validating the modified template, storing the modified template in the template catalog.

18. A non-transitory computer readable storage medium comprising instructions which, when executed, cause a machine to at least:
map a requirement and system information to a first tag, the system information associated with a cloud computing environment, the first tag including first instructions to deploy a first virtual resource to the cloud computing environment, the first virtual resource corresponding to physical hardware;
identify a template based on the mapping, the template including the first tag;
generate a plan based on the template to generate a first workload domain having a first priority, the plan including an order of execution of tags to deploy virtual resources including the first virtual resource to the cloud computing environment, the tags including the first tag;
determine whether or not a first physical hardware resource is available to generate the first workload domain;
in response to determining that the first physical hardware resource is not available to generate the first workload domain, release a second physical hardware resource from a second workload domain having a second priority less than the first priority; and
deploy the first workload domain to the cloud computing environment based on the plan by executing second instructions associated with the tags included in the template, the first workload domain to execute an application, the first workload domain to include at least one of (i) one or more of the first physical hardware resource or second physical hardware resource.

19. The non-transitory computer readable storage medium of claim 18, wherein the requirement includes an availability requirement, a capacity requirement, a performance requirement, or a security requirement.

20. The non-transitory computer readable storage medium of claim 18, wherein the system information includes at least one of an identification of a second virtual resource of the cloud computing environment, a version of the second virtual resource, an availability of the second virtual resource, or a usage of the second virtual resource.

21. The non-transitory computer readable storage medium of claim 18, wherein the first tag includes a tag name field, a primary resource field, a primary resource version field, a tag data field, and a dependent resource field.

22. The non-transitory computer readable storage medium of claim 21, wherein the dependent resource field identifies the first virtual resource, a version of the first virtual resource, and the first instructions to deploy the first virtual resource to the first workload domain.

23. The non-transitory computer readable storage medium of claim 18, wherein the template includes a template name field, a template version field, a template description field, a template type field, and a required template field.

24. The non-transitory computer readable storage medium of claim 18, wherein the template includes a resource field, a resource version field, and a tag field including the tags representing the second instructions to deploy one or more of the virtual resources associated with the resource field.

25. The non-transitory computer readable storage medium of claim 18, wherein the virtual resources include the first virtual resource and a second virtual resource and the tags include the first tag and a second tag, the template including (1) the first virtual resource and the first tag including the first instructions to deploy the first virtual resource and (2) the second virtual resource and the second tag including third instructions to deploy the second virtual resource.

26. The non-transitory computer readable storage medium of claim 18, wherein the instructions, when executed, cause the machine to at least generate a modified template by modifying the template by at least one of adding a second tag, removing one of the tags, or modifying one of the tags.

27. The non-transitory computer readable storage medium of claim 26, wherein the instructions, when executed, cause the machine to at least:
validate the modified template by comparing the modified template to at least one of a validation rule or a validated template included in a template catalog; and
store the modified template in the template catalog when the modified template is modified.

* * * * *